(12) United States Patent
Morris et al.

(10) Patent No.: US 9,476,599 B2
(45) Date of Patent: Oct. 25, 2016

(54) HOT WATER STORAGE UNIT, RELIEF DEVICE AND METHOD OF MAKING A HOT WATER STORAGE UNIT

(71) Applicant: Aquilli Pty Ltd, Nedlands (AU)

(72) Inventors: Peter John Morris, Canning Vale (AU); Garry Rodney White, South Perth (AU)

(73) Assignee: TRITECK LIMITED, Hong Kong (CN)

( * ) Notice: Subject to any disclaimer, the term of this patent is extended or adjusted under 35 U.S.C. 154(b) by 0 days.

(21) Appl. No.: 14/451,168

(22) Filed: Aug. 4, 2014

(65) Prior Publication Data
US 2015/0034171 A1    Feb. 5, 2015

(30) Foreign Application Priority Data
Aug. 4, 2013 (AU) ................................ 2013902919

(51) Int. Cl.
*F16K 17/00* (2006.01)
*F24D 19/08* (2006.01)
(Continued)

(52) U.S. Cl.
CPC ........... *F24D 19/082* (2013.01); *F16K 17/048* (2013.01); *F16K 17/0486* (2013.01);
(Continued)

(58) Field of Classification Search
CPC ............. F24D 19/082; F24D 19/1051; F24D 19/083; F24D 2220/0257; F16K 17/048; F16K 17/0486; Y10T 137/7837; Y10T 137/0486; Y10T 137/86324; F28D 20/0034; F24H 9/2007; F28F 2265/12
USPC ............ 137/457, 315.11, 461, 359; 122/14.1
See application file for complete search history.

(56) References Cited

U.S. PATENT DOCUMENTS

| 688,256 | A | * | 12/1901 | Mitchell | ........................ 137/587 |
| 1,556,001 | A | * | 10/1925 | McBride | ........................ 137/587 |

(Continued)

FOREIGN PATENT DOCUMENTS

| AU | 2007203037 | 1/2008 |
| AU | 2013206041 | 7/2013 |

(Continued)

OTHER PUBLICATIONS

European Patent Office, Extended European Search Report for Application No. 15152370.1, 8 pages, Munich, Germany.
(Continued)

*Primary Examiner* — John K Fristoe, Jr.
*Assistant Examiner* — Umashankar Venkatesan
(74) *Attorney, Agent, or Firm* — Marger Johnson

(57) ABSTRACT

A hot water storage unit 100 having a vessel 102, in which hot water is storable, an outer casing 104 enclosing the vessel 102, a hot water outlet 114 for heated water to exit from inside the vessel 102, and a relief device 106. The relief device 106 relieves excess pressure and/or temperature from inside the vessel 102 by allowing water to escape from inside the vessel 102 and exit from the relief device 106. The relief device 106 comprises a housing 108 containing the operational components of the relief device 106. The relief device 106 is removably retainable relative to the vessel 102 such that the housing 108 of the relief device 106 is located substantially behind the outer casing 104 of the hot water storage unit 100 on the inner side 122 of the outer casing 104.

The hot water storage unit 100 can be made by removably retaining the relief device 106 relative to the vessel 102 and placing the outer casing 104 around the vessel 102 so that the housing 108 of the relief device 106 is located substantially behind the outer casing 104, on the inner side 122 of the outer casing 104, after the outer casing 104 has been placed around the vessel 102.

45 Claims, 21 Drawing Sheets

(51) Int. Cl.
*F24D 19/10* (2006.01)
*F16K 17/04* (2006.01)
*F16K 17/38* (2006.01)
*F16K 31/00* (2006.01)
*F24H 9/20* (2006.01)
*F28D 20/00* (2006.01)

(52) U.S. Cl.
CPC ............. *F16K17/38* (2013.01); *F16K 31/002* (2013.01); *F24D 19/083* (2013.01); *F24D 19/1051* (2013.01); *F24H 9/2007* (2013.01); *F28D 20/0034* (2013.01); *F24D 2220/0257* (2013.01); *F28F 2265/12* (2013.01); *Y02E 60/142* (2013.01); *Y10T 137/0486* (2015.04); *Y10T 137/7837* (2015.04); *Y10T 137/86324* (2015.04)

(56) References Cited

U.S. PATENT DOCUMENTS

| | | | |
|---|---|---|---|
| 1,856,845 A * | 5/1932 | Donahue | 137/359 |
| 1,957,083 A * | 5/1934 | Schneible | 137/587 |
| 2,189,490 A * | 2/1940 | Hart | 122/14.1 |
| 2,738,796 A * | 3/1956 | Chadwick | 137/43 |
| 3,662,949 A * | 5/1972 | McIntosh et al. | 236/92 C |
| 3,662,950 A | 5/1972 | Mcintosh | |
| 3,757,815 A | 9/1973 | Orr | |
| 3,961,156 A * | 6/1976 | Patton | 392/451 |
| 4,211,187 A | 7/1980 | Farris | |
| 4,237,593 A | 12/1980 | Wolf | |
| 4,259,984 A | 4/1981 | Pemberton | |
| 4,480,173 A | 10/1984 | Butterfield | |
| 4,527,543 A * | 7/1985 | Denton | 122/19.2 |
| 5,023,031 A | 6/1991 | West | |
| 5,159,918 A | 11/1992 | Roehl | |
| D355,954 S | 2/1995 | Powell | |
| 5,954,222 A * | 9/1999 | White et al. | 220/582 |
| D430,272 S | 8/2000 | Hung-Lin | |
| 6,282,372 B1 | 8/2001 | Boros | |
| 6,553,946 B1 | 4/2003 | Abraham | |
| D476,719 S | 7/2003 | Taylor | |
| 6,698,714 B2 | 3/2004 | Dulac | |
| 6,736,162 B2 | 5/2004 | Schimnowski | |
| D561,302 S | 2/2008 | Brockington | |
| D564,637 S | 3/2008 | Brockington | |
| 7,971,798 B2 | 7/2011 | Pechtold | |
| 8,337,081 B1 * | 12/2012 | Holmberg et al. | 374/121 |
| 2003/0015677 A1 | 1/2003 | Dulac | |
| 2008/0011364 A1 | 1/2008 | Fontaine | |
| 2009/0173400 A1 | 7/2009 | Brandt | |
| 2009/0308332 A1 * | 12/2009 | Tanbour | 122/14.2 |
| 2010/0025401 A1 * | 2/2010 | Jagemann et al. | 220/203.29 |
| 2010/0059047 A1 | 3/2010 | Bourke | |
| 2010/0133258 A1 | 6/2010 | Fima | |
| 2010/0139789 A1 | 6/2010 | Dulac | |
| 2011/0168277 A1 * | 7/2011 | Dulac | 137/468 |
| 2011/0226353 A1 | 9/2011 | Pechtold | |
| 2012/0186668 A1 * | 7/2012 | Knepple et al. | 137/511 |
| 2014/0209041 A1 | 7/2014 | Hardesty | |

FOREIGN PATENT DOCUMENTS

| | | |
|---|---|---|
| AU | 2013201128 | 10/2013 |
| AU | 2013205203 | 11/2013 |
| AU | 2012258441 | 1/2014 |
| AU | 2013201803 | 1/2014 |
| AU | 2013205201 | 5/2014 |
| AU | 2013205018 | 10/2014 |
| AU | 2013205195 | 10/2014 |
| CN | 201387165 | 1/2010 |
| CN | 201896979 | 7/2011 |
| DE | 202011108497 | 3/2013 |
| FR | 2379742 | 9/1978 |
| FR | 2386749 | 11/1978 |
| GB | 2475412 | 5/2011 |
| JP | 2006105530 | 4/2006 |
| JP | 2007187388 | 7/2007 |
| JP | 2007303786 | 11/2007 |
| JP | 2009228981 | 10/2009 |
| JP | 2009281675 | 12/2009 |
| JP | 2010139168 | 6/2010 |
| JP | 2010230190 | 10/2010 |
| JP | 2010230191 | 10/2010 |
| JP | 2011047506 | 3/2011 |
| JP | 2011106791 | 6/2011 |
| JP | 2011153772 | 8/2011 |
| JP | 2011153774 | 8/2011 |
| JP | 2011153775 | 8/2011 |
| JP | 2014178074 | 9/2014 |
| WO | 0177558 | 10/2001 |
| WO | 0225150 | 3/2002 |
| WO | 2008109941 | 9/2008 |

OTHER PUBLICATIONS

Australian Patent Office, International-Type Search Report for Application No. 2013902919, 11 pages, Woden, Australia.

* cited by examiner

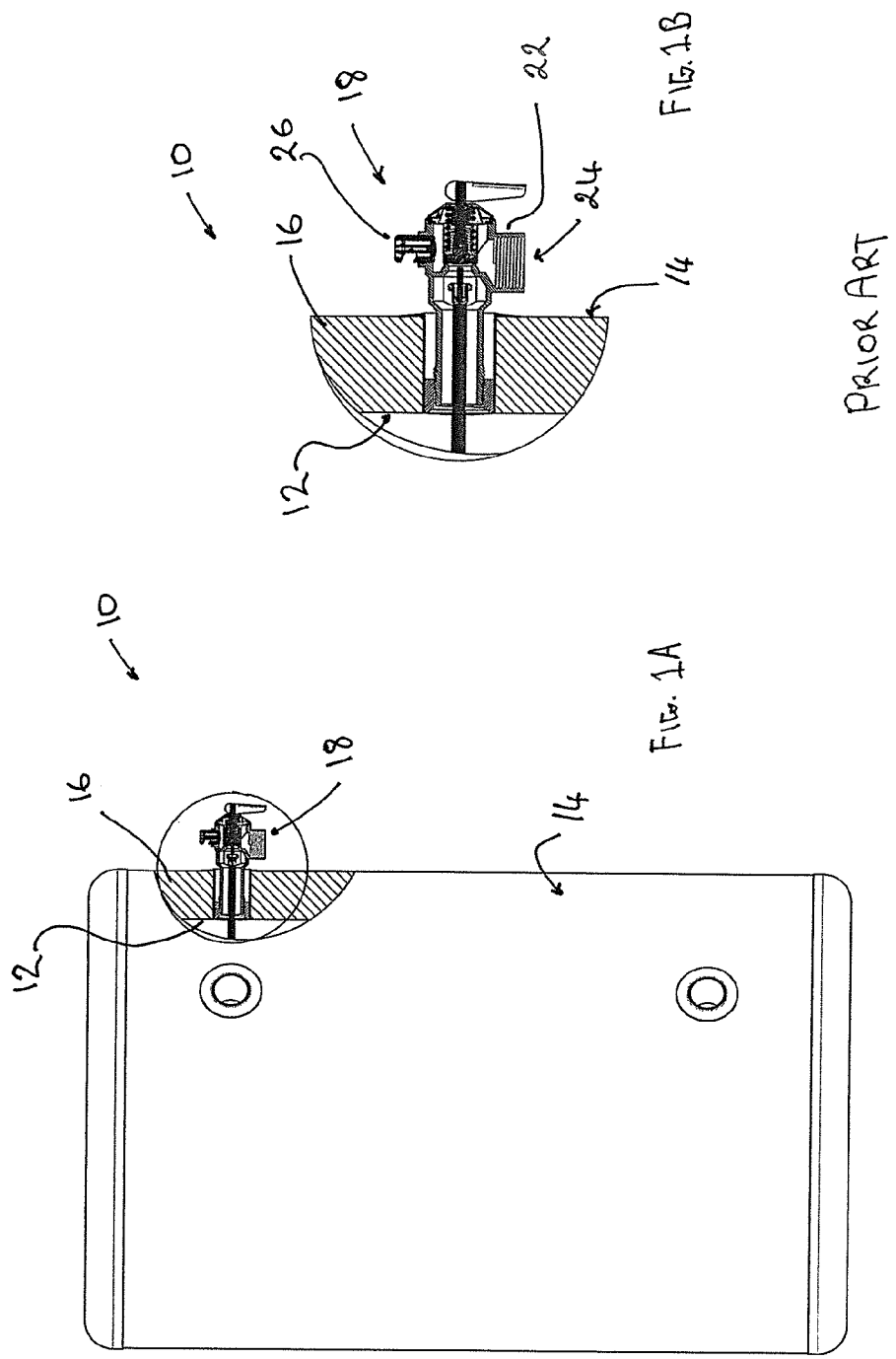

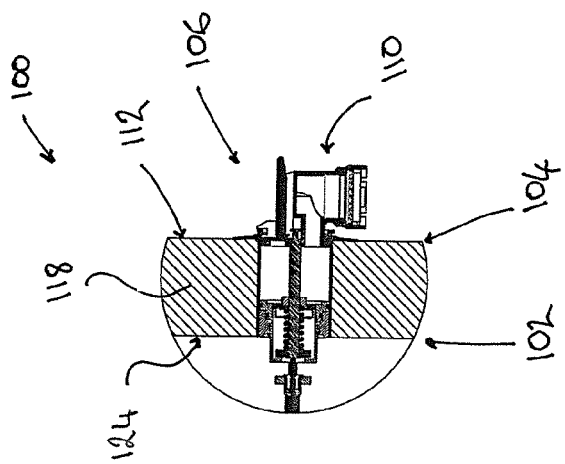
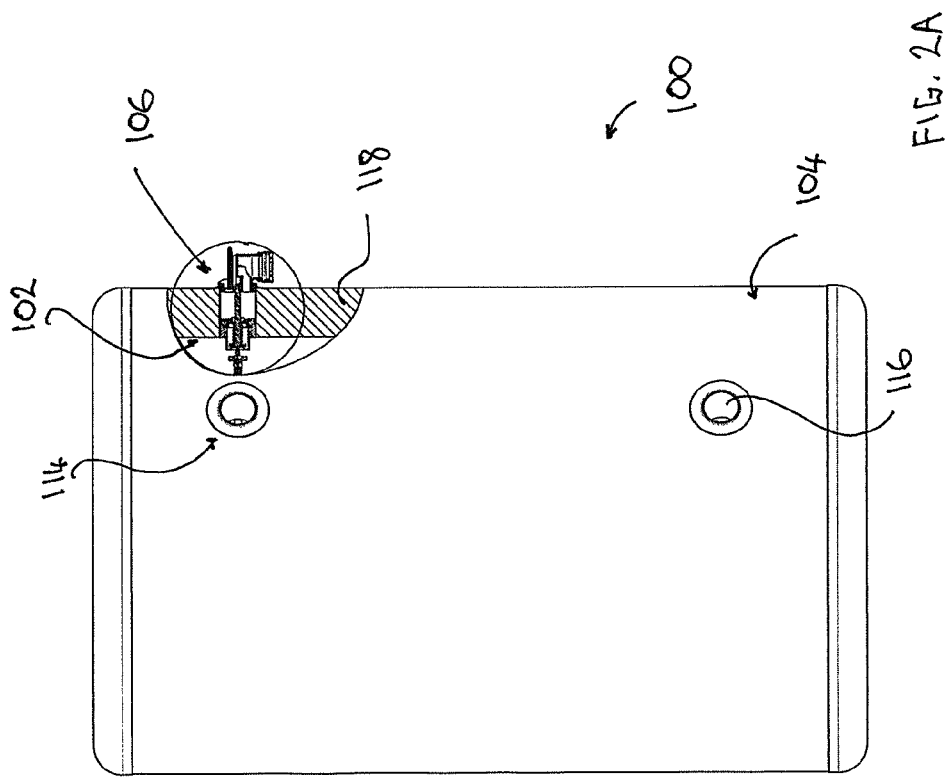

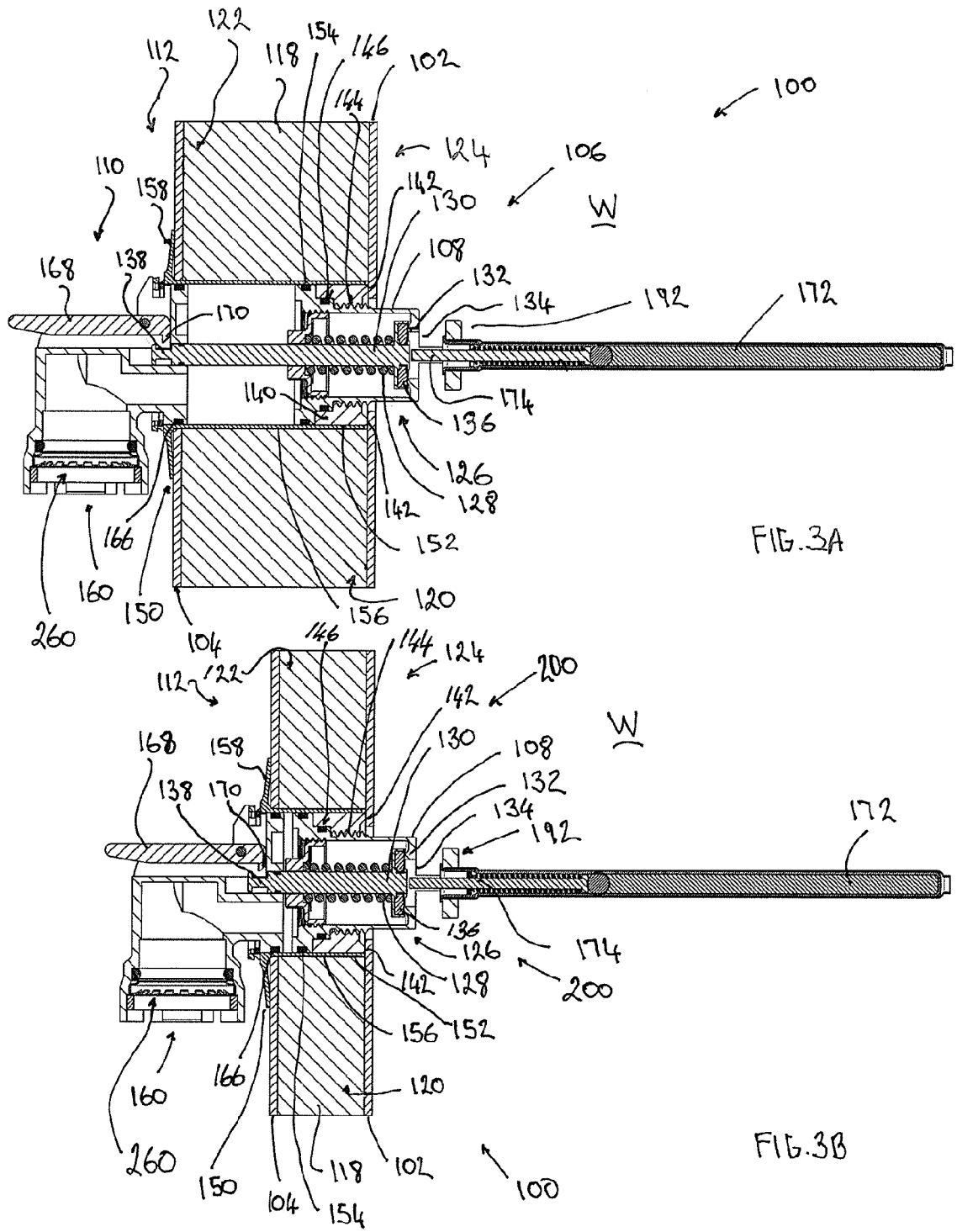

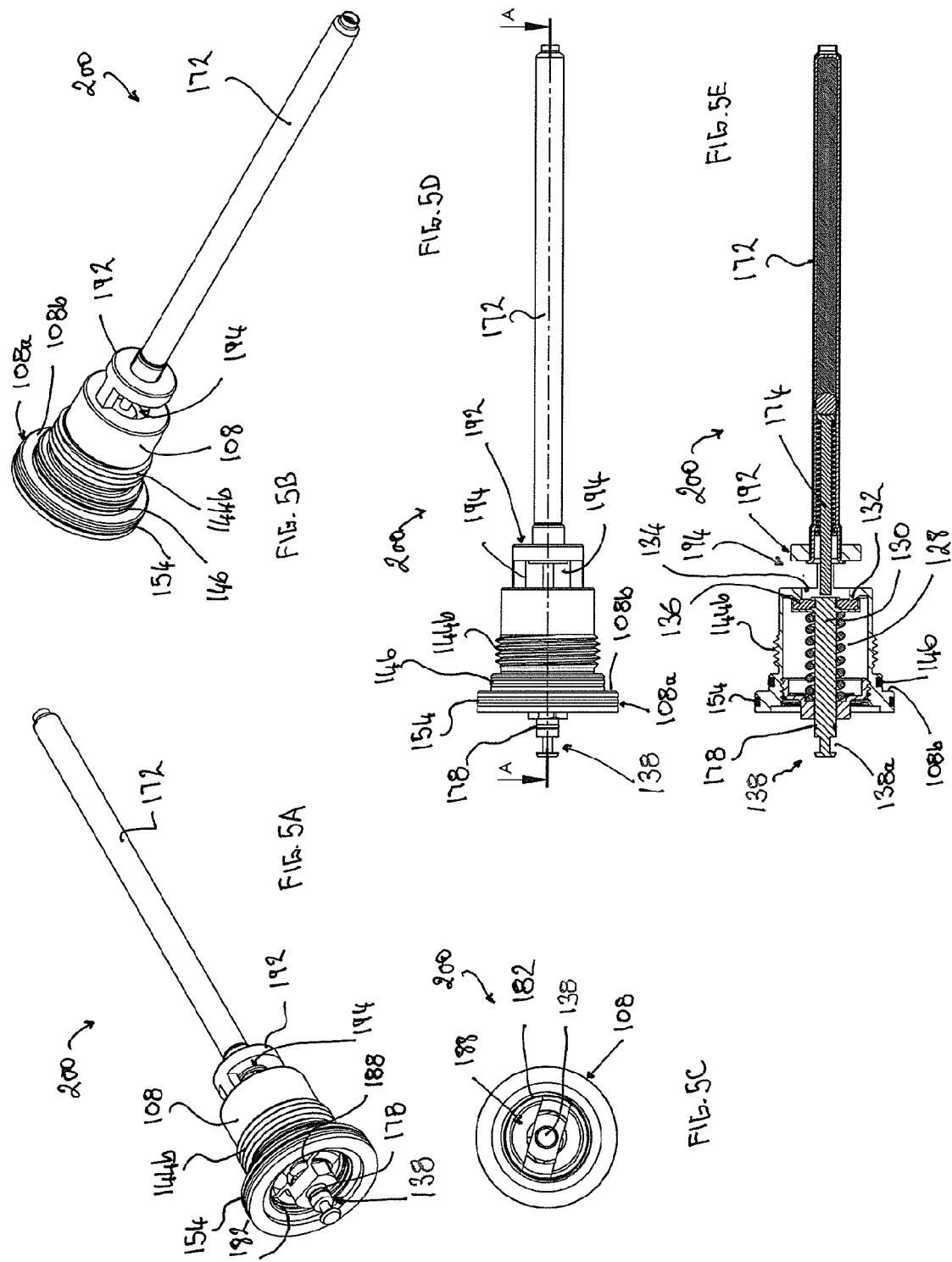

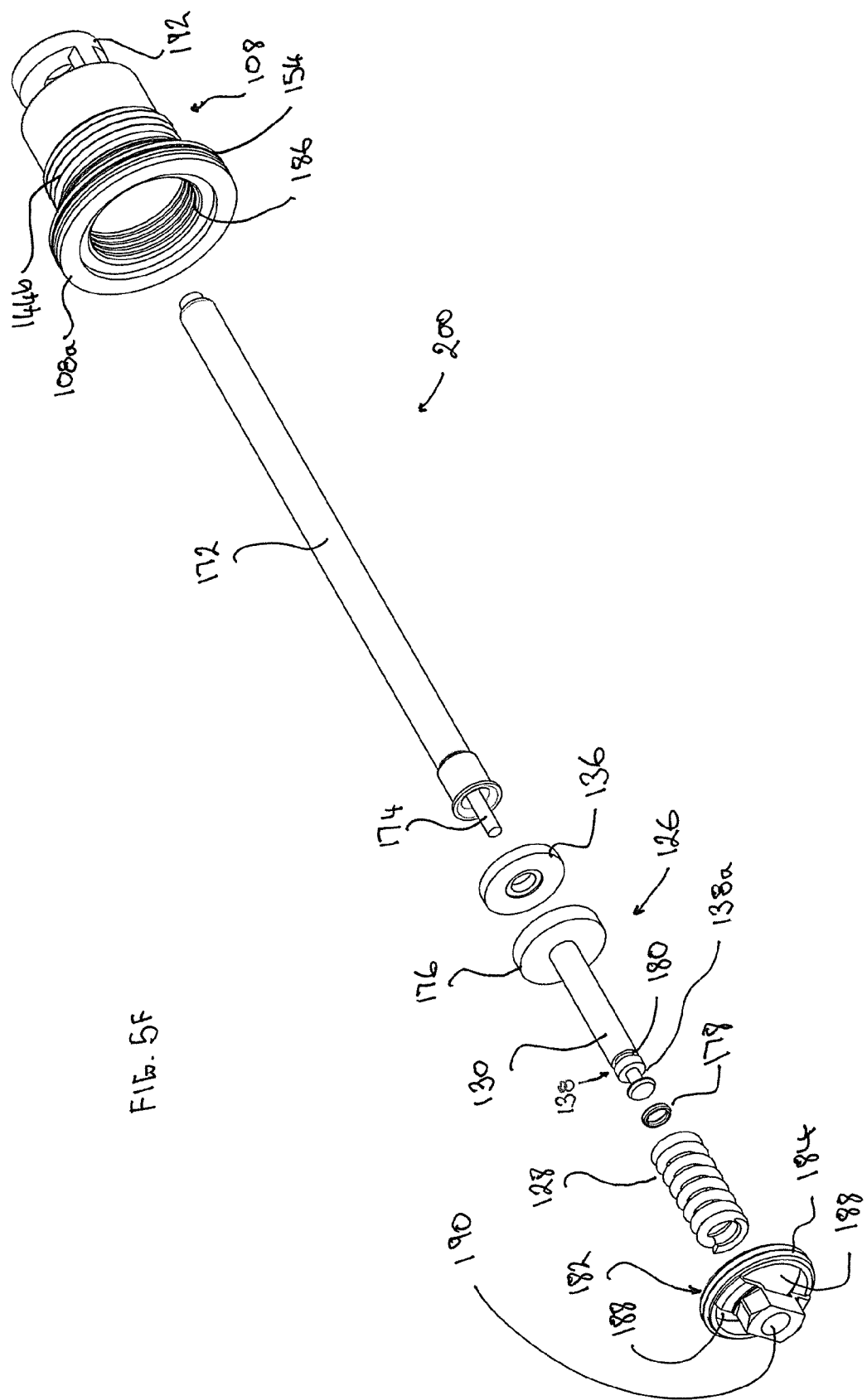

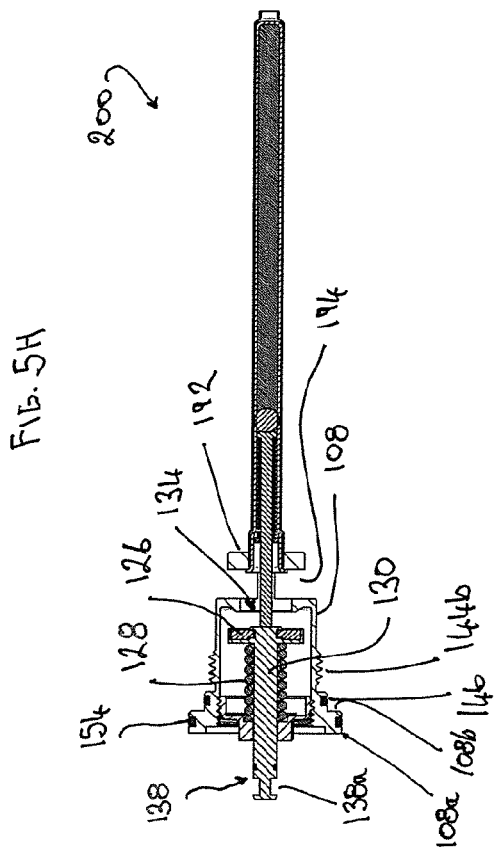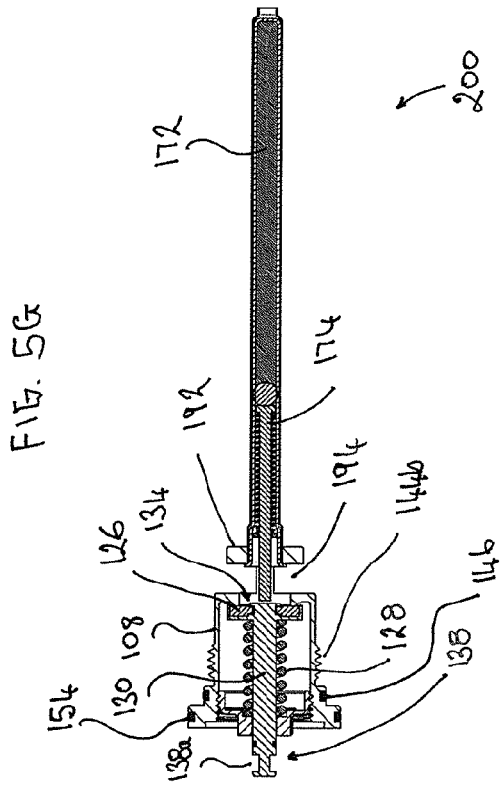

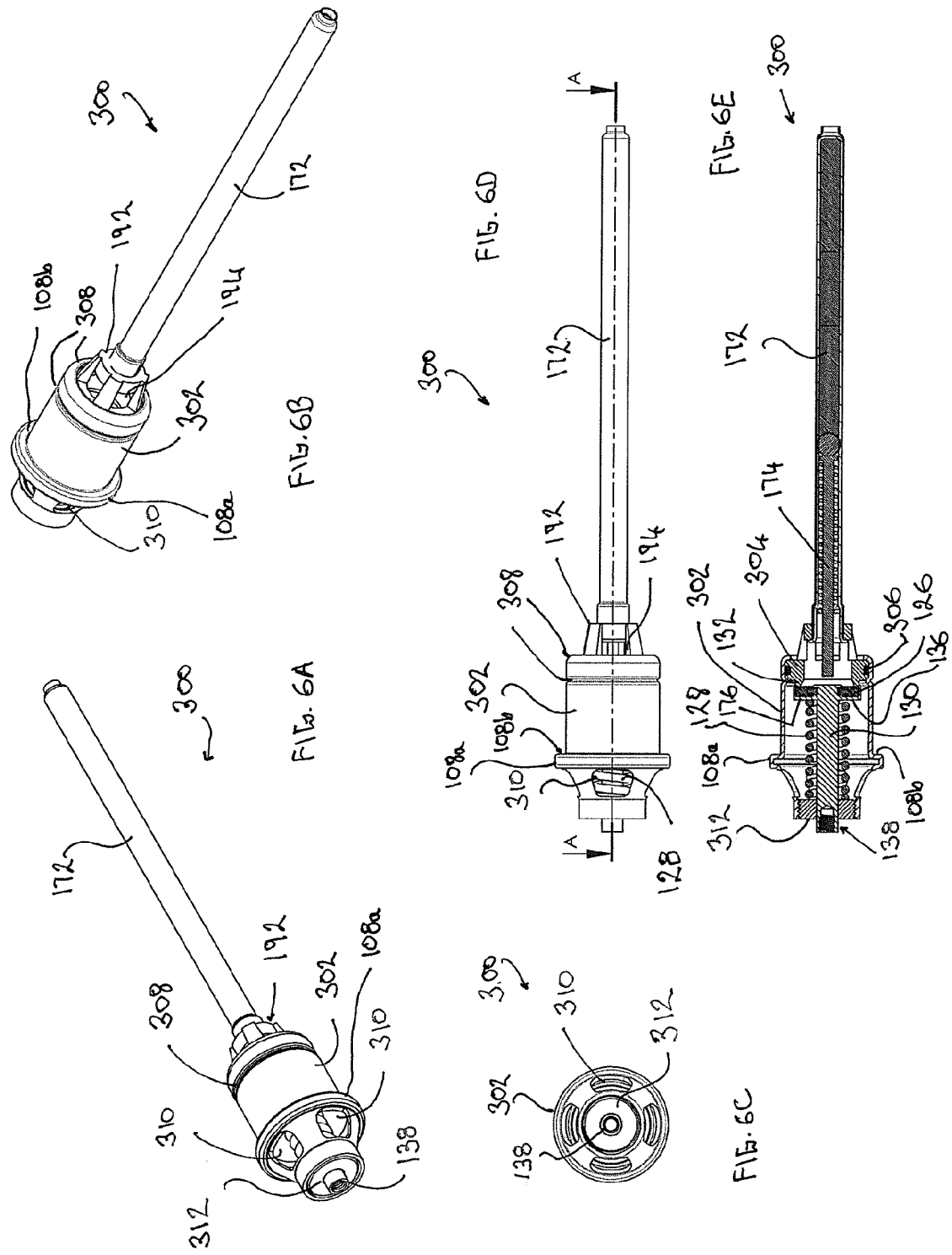

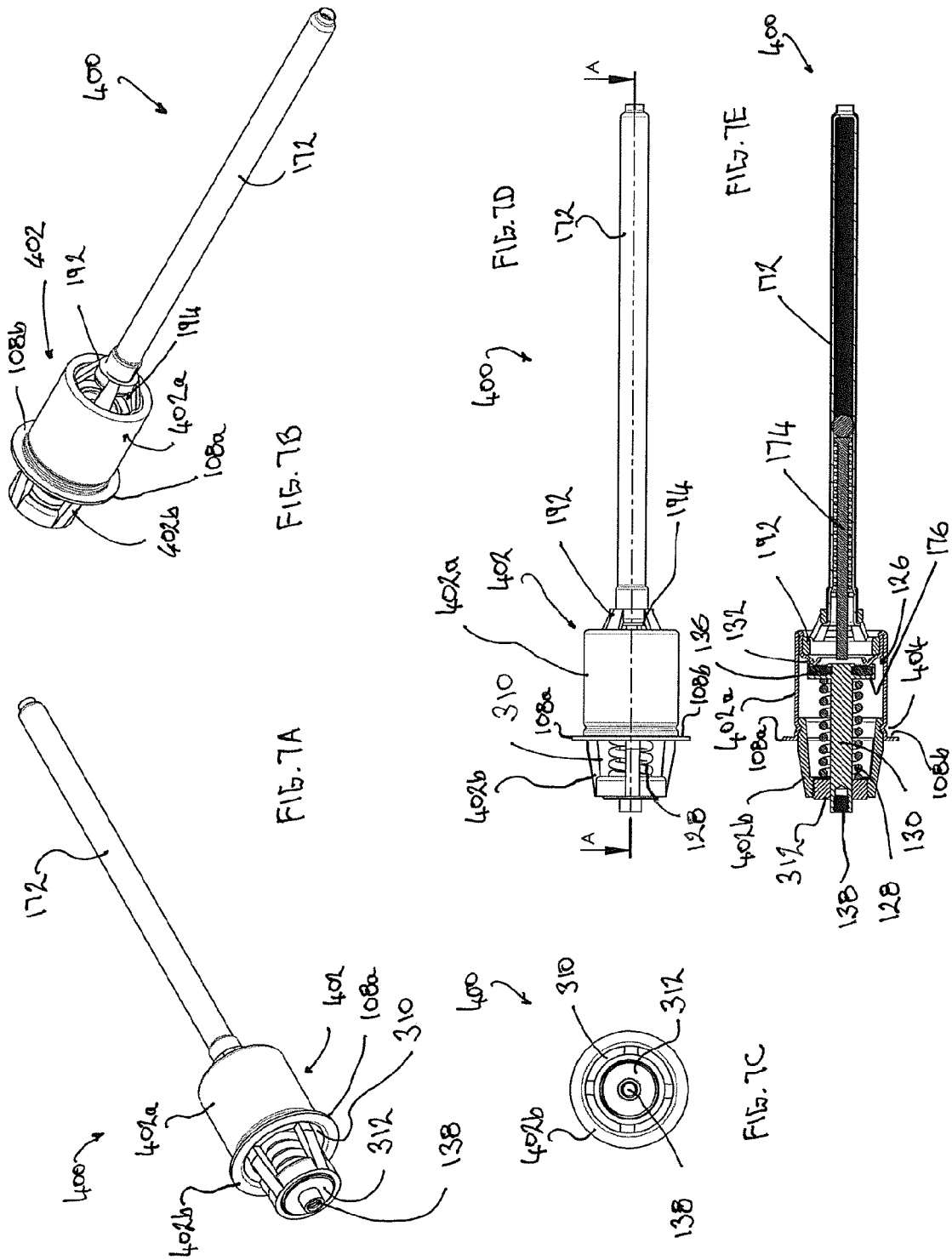

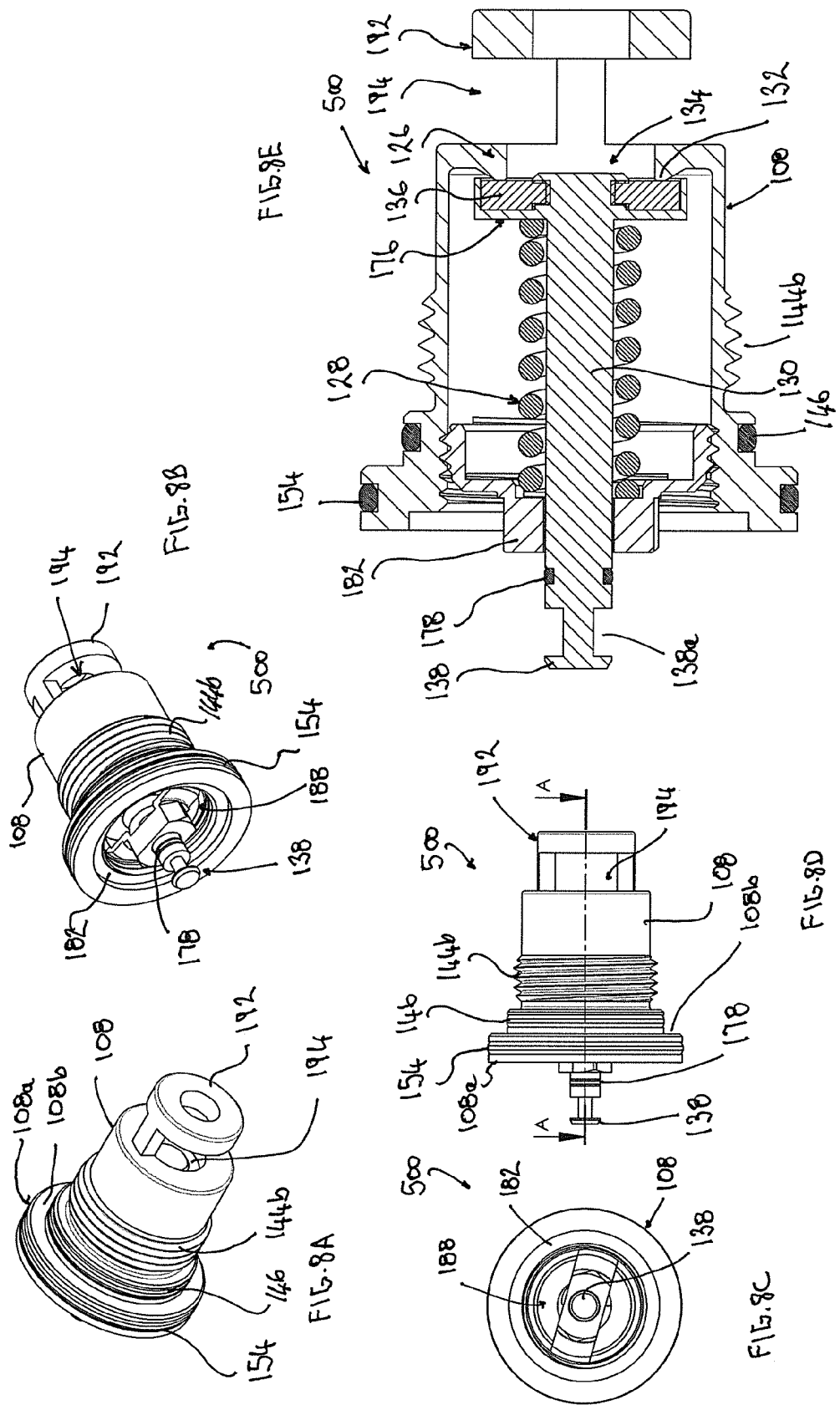

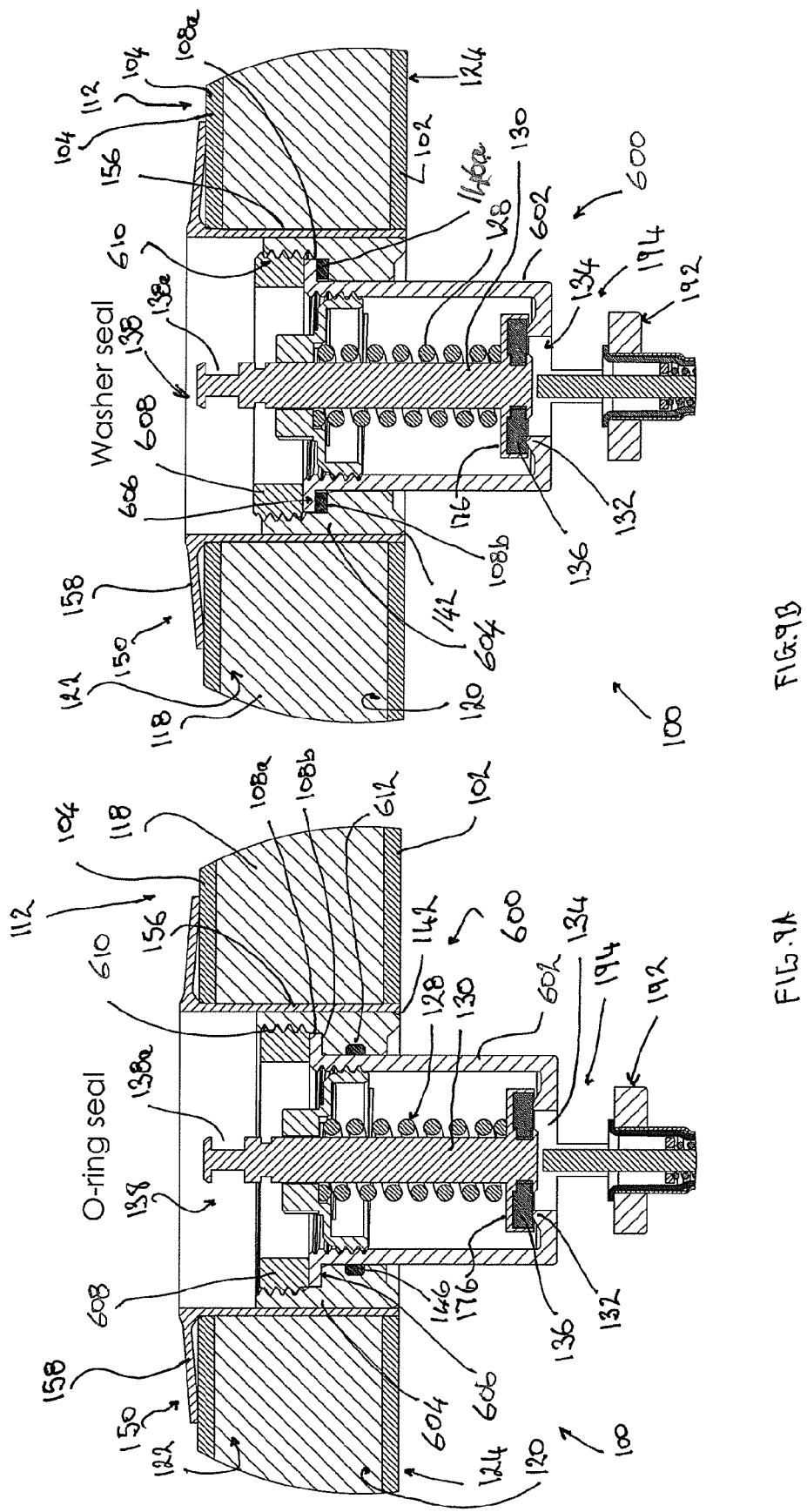

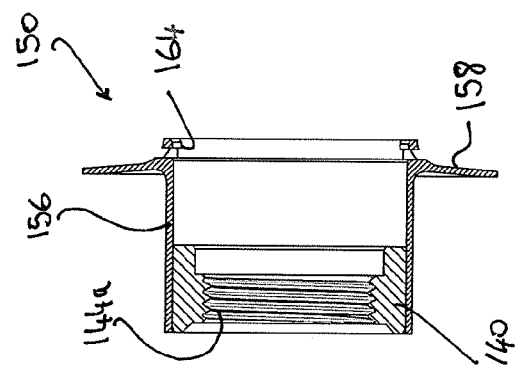
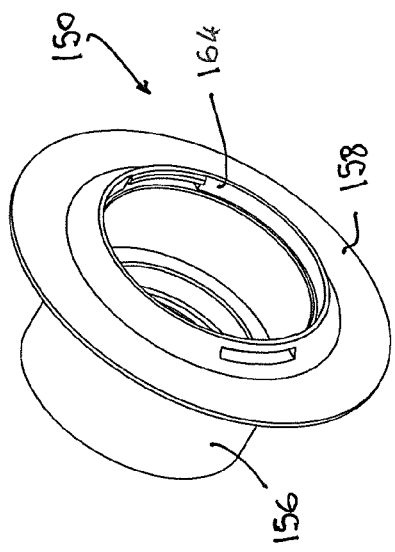
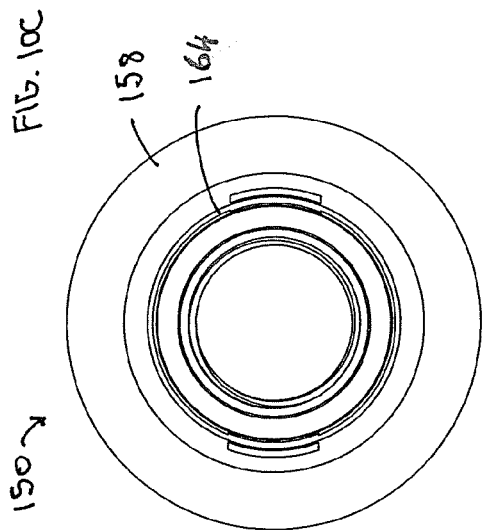
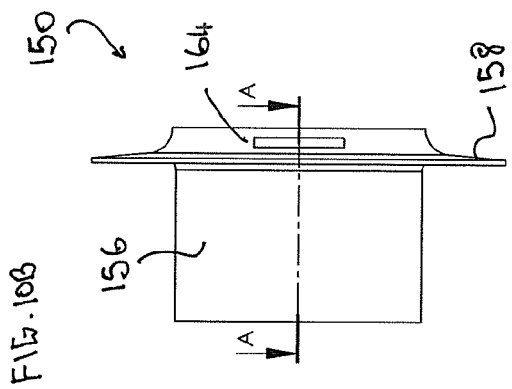

FIG. 12A
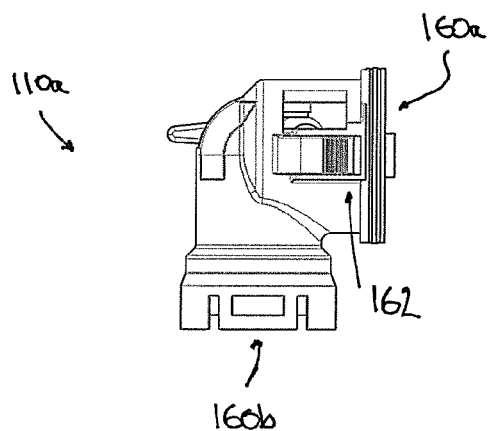
FIG. 12B
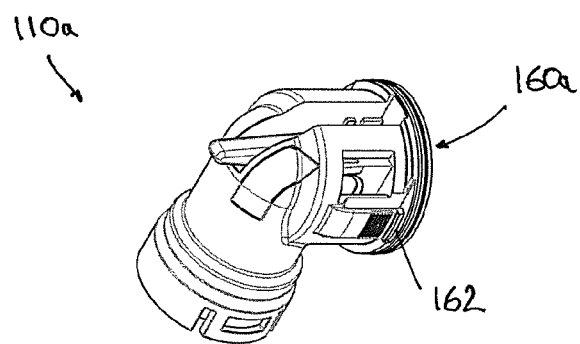
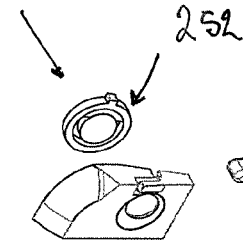
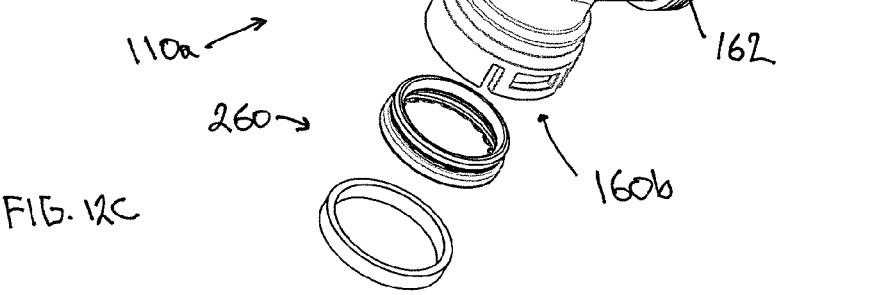
FIG. 12C

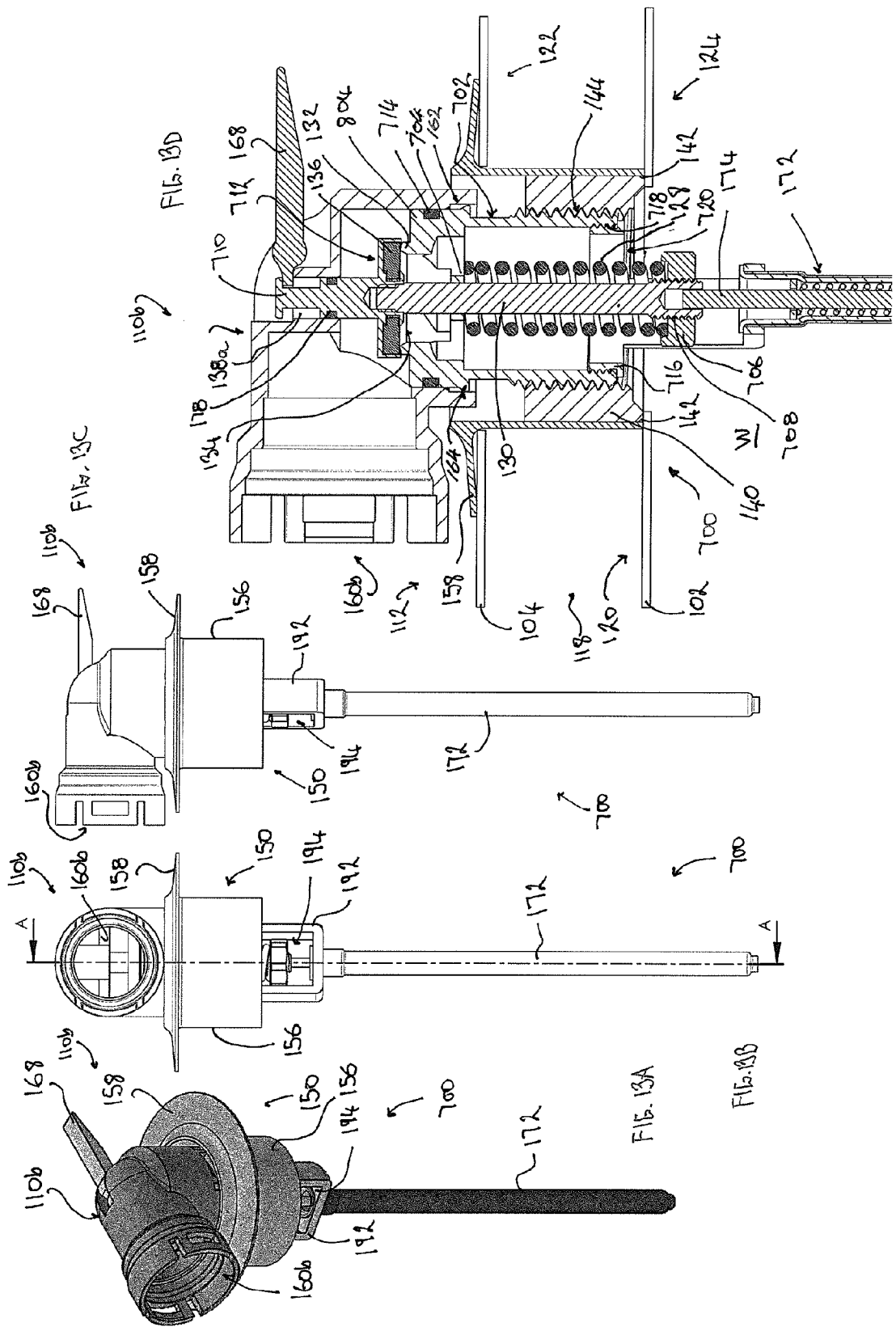

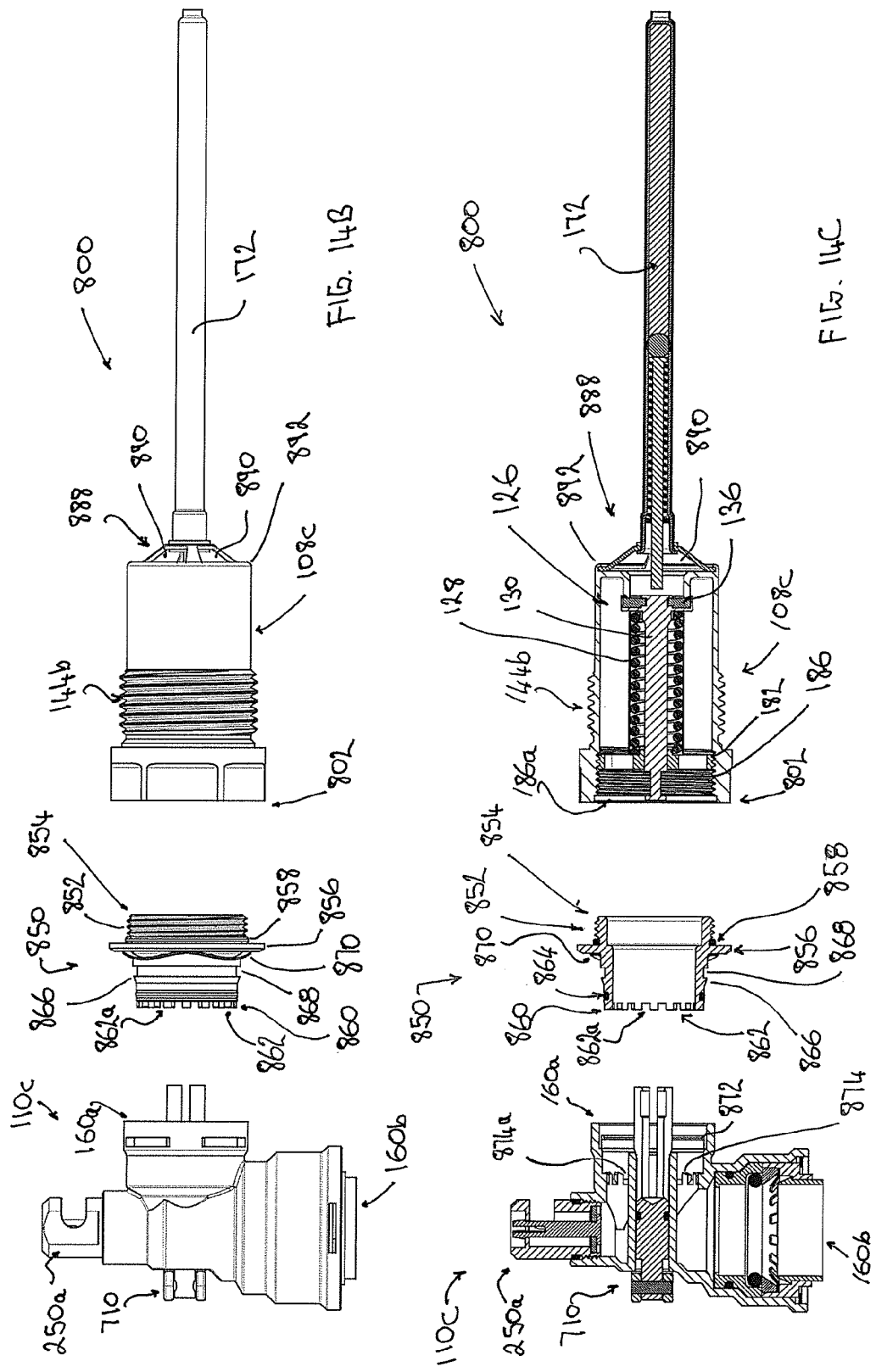

HOT WATER STORAGE UNIT, RELIEF DEVICE AND METHOD OF MAKING A HOT WATER STORAGE UNIT

Throughout this specification, unless the context requires otherwise, the word "comprise" and variations such as "comprises", "comprising" and "comprised" are to be understood to imply the presence of a stated integer or group of integers but not the exclusion of any other integer or group of integers.

Throughout this specification, unless the context requires otherwise, the word "include" and variations such as "includes", "including" and "included" are to be understood to imply the presence of a stated integer or group of integers but not the exclusion of any other integer or group of integers.

The headings and subheadings in this specification are provided for convenience to assist the reader, and they are not to be interpreted so as to narrow or limit the scope of the disclosure in the description, claims, abstract or drawings.

TECHNICAL FIELD

The present invention relates to a hot water storage unit and a relief device for a hot water storage unit to relieve pressure and/or temperature.

BACKGROUND ART

Any discussion of background art, any reference to a document and any reference to information that is known, which is contained in this specification, is provided only for the purpose of facilitating an understanding of the background art to the present invention, and is not an acknowledgement or admission that any of that material forms part of the common general knowledge in Australia or any other country as at the priority date of the application in relation to which this specification has been filed.

Hot water storage units are used in domestic, commercial and other installations to store water that has been heated by a heater to produce heated water or hot water. The hot water is contained within a sealed vessel, or cylinder, of the hot water storage unit. The vessel is enclosed by an outer casing, which forms the exterior of the hot water storage unit. Various types and arrangements of heaters may be used for heating the water. In some systems, the heater may be provided inside the vessel, e.g. electrically powered heaters that employ heating elements inside the vessel to heat the water. In gas-powered systems, a gas burner is provided outside and beneath the vessel, inside the outer casing, to heat water in the vessel. In other systems, the heater may be provided outside the vessel and the outer casing, e.g. solar hot water systems and heat pump systems may employ such an arrangement.

Such hot water storage units are provided with a valve to relieve excess pressure and/or temperature from inside the vessel by allowing water to escape from inside the vessel. They are often referred to as PTR valves, i.e. pressure-temperature relief valves. If the pressure and/or temperature inside the vessel reaches, or exceeds, the (set) pressure and/or temperature to which the PTR valve has been set, the PTR valve will open and water will be able to escape from the vessel via the (open) PTR valve. The PTR valve is provided as a safety mechanism to ensure that potentially hazardous excess temperatures and/or pressures do not build up inside the vessel.

A conventional hot water storage unit 10 is shown in FIGS. 1A to 1C. The conventional hot water storage unit 10 comprises a vessel 12, an outer casing 14 that encloses the vessel 12, insulation material 16 that is provided between the vessel 12 and the outer casing 14, and a conventional PTR valve 18. The PTR valve 18 has a body 20 that contains the operational components of the PTR valve 18. The body 20 also incorporates a drain 22. If the temperature and/or pressure of the water inside the vessel 12 reaches or exceeds the set pressure and/or temperature of the PTR valve, the PTR valve opens and water can exit from the PTR valve 18, via the drain outlet 24, to reduce the temperature and/or pressure of the water inside the vessel. For example, the temperature of the water in the vessel may be sensed by a probe 28. When the pressure and/or temperature falls below the set pressure and/or temperature of the PTR valve, the PTR valve closes. The body 20 may also incorporate an auxiliary relief device 26. When the PTR valve 18 is connected with the hot water storage unit 10, usually by a screw thread arrangement (as is shown in FIGS. 1A to 1C), the part of the body 20, that contains the operational components of the PTR valve 18, is located outside the outer casing 14. As can be seen from FIGS. 1A to 1C, this results in a substantial portion of the body 20 of the PTR valve 18 being located outside the outer casing 14. This gives rise to a number of problems and disadvantages.

Firstly, having the PTR valve located outside the outer casing of conventional hot water storage units means that PTR valve projects out from the side of the otherwise even outer casing and is susceptible to damage when the hot water storage unit is in transit, i.e. from the time of manufacture of the hot water storage unit until the time of installation at the required site. For this reason, manufacturers do not usually factory-fit the PTR valve. Instead, the hot water storage unit leaves the factory without the PTR valve fitted. Manufacturers provide the PTR valve separately for later installation by the installer, e.g. a plumber, at the time of installation of the hot water storage unit at the required site, e.g. a domestic, commercial or other installation site.

In addition, because the hot water storage unit leaves the factory without the PTR valve fitted, the manufacturer cannot perform a pressure test of the vessel to provide quality assurance that the vessel meets the required operating standards since the water storage unit would have to leave the factory with the PTR valve fitted for such quality assurance to be validly given by the manufacturer.

Furthermore, problems can arise when the PTR valve is provided separately and is installed by the installer, e.g. a plumber, at the time of installation of the hot water storage unit at the required site. This is because the PTR valve must be connected with the hot water storage unit such that the outlet of the drain is orientated downwardly, at a suitable angle, so that water exiting the PTR valve falls away from the drain and does not pool in the drain. This requires one or more attempts by the installer to connect the PTR valve, using different amounts of thread tape on the screw thread of the PTR valve, until the outlet of the drain is orientated downwardly, at a suitable angle, and the PTR valve is securely attached (i.e. that the connection between the PTR valve and the hot water storage unit does not leak, which itself cannot be assured until the hot water storage unit is actually operating, which is itself disadvantageous). However, this process can be a time-consuming for the installer, requiring several attempts merely to properly connect the PTR valve with the hot water storage unit.

In addition to the time consumed, problems may also arise if the connection of the PTR valve with the hot water storage unit is over or under tightened. Over-tightening may result in damage to components, such as the screw threads on the PTR valve or the hot water storage unit. Under-tightening may result in improper sealing at the connection, with consequential leakage of water from the vessel. Each of these may be perceived as a fault by the consumer, necessitating a service call from the consumer to the manufacturer or a service agent to properly connect or to replace the PTR valve. This is inconvenient and an annoyance for the consumer and is time-consuming and costly for the manufacturer or service agent having to attend the service call.

A further disadvantage of having a substantial portion of the body of the PTR valve located outside the outer casing is that heat loss occurs from the heated water inside the vessel, through the body of PTR valve, and to the ambient air outside the outer casing. Indeed, this has resulted in manufacturers of PTR valves using separate insulation casings to enclose the portion of the body of the PTR valve located outside the outer casing to thereby reduce heat losses.

Conventional hot water storage units suffer from another disadvantage in that, to accommodate the different thicknesses of insulation that may be used in different units, the probes (28) must be made in a range of lengths so that they are of sufficient length to extend into the water in the vessel (12).

SUMMARY OF INVENTION

The present invention provides that a relief device may be factory-fitted at the time of manufacture of the hot water storage unit without exposing the relief device to damage whilst it is in transit, i.e. from the time of manufacture of the hot water storage unit until the time of installation at the required site. In addition, the present invention provides that installation by the installer is still possible, in the event that the manufacturer prefers to not factory-fit the relief device. Both options are available to the manufacturer under the present invention and either option may be adopted without any adaptation or modification being required to the relief device or remainder of the hot water storage unit.

A removable drain is provided, in use, to direct away any water that is discharged via the relief device. The drain may be detachable, or releasable, such that it is removable.

In accordance with a first aspect of the present invention there is provided a hot water storage unit comprising
  a vessel, in which hot water is storable,
  an outer casing enclosing the vessel,
  a hot water outlet for heated water to exit from inside the vessel,
  a relief device, in use, to relieve excess pressure and/or temperature from inside the vessel by allowing water to escape from inside the vessel and exit from the relief device,
  wherein the relief device comprises a housing containing operational components of the relief device and the relief device is removably retainable relative to the vessel, such that the housing is located substantially behind the outer casing on the inner side of the outer casing.

Preferably, a drain is provided, in use, to direct water, which exits from the relief device, away from the outer casing, wherein the drain is removably retainable at the outer side of the outer casing.

The drain may be removably retainable at the outer side of the outer casing by being removably retainable with the relief device.

Alternatively, the drain may be removably retainable at the outer side of the outer casing by being removably retainable with a support member located adjacent the outer casing.

In another alternative, the drain may be removably retainable at the outer side of the outer casing by being retainable with an intermediate member that is removably retainable with the relief device.

Preferably, a retention clip (such as a circlip) or integral engagement means, whereby the drain is engageable directly with the relief device or the support member, is used to removably retain the drain. The integral engagement means, for example, may be complimentary snap-on connectors. One such connector is provided on the drain and the other on the relief device or support member, as the case may be, such that they are releasably, or detachably, engageable to thereby removably retain the drain.

At least one seal may be provided between the drain and the support member.

Preferably, the outermost end of the relief device, i.e. the end that is spaced from the vessel, does not extend appreciably (i.e. not substantially) beyond the support member.

Preferably, the support member is provided as an escutcheon.

Preferably, the drain has an outlet and the outlet of the drain may be positioned at a selected orientation.

Preferably, the drain is removably retainable at the outer side of the outer casing such that it is movable (e.g. rotatable) relative to the relief device to thereby permit the outlet of the drain to be positioned at a selected orientation.

In the alternative in which an intermediate member is provided, the drain may be movable (e.g. rotatable) relative to the intermediate member and the relief device to thereby permit the outlet of the drain to be positioned at a selected orientation.

At least one seal may be provided between the relief device and the drain.

Preferably, the drain is provided with a manually operable member that is operably engageable with the relief device to open the relief device such that water can exit from the vessel via the relief device.

The drain may be provided with means to connect a pipe, or other conduit, adjacent the outlet of the drain.

The drain may be in the form of an elbow-shaped fitting.

The relief device has an outlet for water to exit therefrom and the drain has an inlet, wherein when the drain is removably retained, as herein before described, the outlet of the relief device is in fluid communication with the inlet of the drain.

Preferably, a socket is connected to the vessel and the relief device is engageable or abuttable with the socket such that the relief device may be removably retainable relative to the vessel.

The relief device and the socket may be provided with respective engageable screw threads such that the relief device may be removably retainable relative to the vessel.

Alternatively, the relief device may abut with the socket and a securing member engages with the socket to secure a portion of the relief device between the socket and the securing member such that the relief device may be removably retainable relative to the vessel.

For example, the securing member may have a screw thread that engages with a screw thread on the socket.

In an alternative example, the securing means may be provided as a retention clip (such as a circlip) or integral engagement means whereby the relief device engages directly with the socket.

In the case of a retention clip, the retention clip engages with the socket to secure a portion of the relief device between the socket and the securing member such that the relief device may be removably retainable relative to the vessel.

In the case of an integral engagement means, the integral engagement means, for example, may be resilient lugs on the relief device engaging in apertures in the socket, or vice versa, such that the relief device may be removably retainable relative to the vessel. In an alternative example, complimentary snap-on connectors, similar to those previously described herein to retain the drain with the relief device or support member, may be used.

Preferably, at least one seal is provided between the relief device and the socket.

Preferably, the relief device comprises closure means at least partly located in the housing.

Preferably, the closure means comprises a spring and a stem, the spring acting to bias the relief device to a closed condition and the stem movable against the biasing action of the spring in an open condition of the relief device, wherein the housing is arranged such that when the relief device is removably retained relative to the vessel, the spring and the stem are located substantially behind the outer casing on the inner side of the outer casing.

The relief device includes a seat, such that sealing means seats on the seat in a closed condition of the relief device and the sealing means is spaced from the seat in an open condition of the relief device such that, in use, water can escape from inside the vessel and exit via the relief device in the open condition of the relief device.

The relief device may be removably retainable relative to the vessel, such that the seat and the closure member are located behind the outer casing on the inner side of the outer casing.

The spring may be located in the housing such that it is isolated from the water, in the vessel, in the closed condition of the relief device.

Preferably, insulation material is provided between the vessel and the outer casing.

A heater is provided to heat the water. Various types and arrangements of heaters may be used. In some systems, the heater may be provided inside the vessel, e.g. electrically powered heaters that employ heating elements inside the vessel to heat the water. In gas powered systems, a gas burner is provided beneath the vessel, inside the outer casing, to heat water in the vessel. In other systems, the heater may be provided outside the vessel and the outer casing, e.g. solar hot water systems and heat pump systems.

In accordance with a second aspect of the present invention there is provided a relief device comprising a housing containing operational components of the relief device wherein, in use, the relief device is removably retainable relative to the vessel of a hot water storage unit such that the housing is located substantially behind the outer casing on the inner side of the outer casing and the relief device relieves excess pressure and/or temperature from inside the vessel by allowing water to escape from inside the vessel and exit from the relief device.

A drain may be provided, in use, to direct away water, which exits from the relief device, wherein the drain is removably retainable with the relief device.

Alternatively, an intermediate member may be provided and the drain is retainable with the intermediate member and the intermediate member is removably retainable with the relief device.

The relief device has an outlet through which water can exit.

In accordance with a third aspect of the present invention there is provided a method of making a hot water storage unit comprising providing a vessel, in which hot water is storable, providing a relief device, the relief device comprising a housing containing operational components of the relief device, providing an outer casing, removably retaining the relief device relative to the vessel, and placing the outer casing around the vessel, wherein the housing is located substantially behind the outer casing, on the inner side of the outer casing, after the outer casing has been placed around the vessel.

Preferably, placing the outer casing around the vessel comprises sliding the outer casing over the vessel.

Preferably, the method further comprises placing insulation material between the vessel and the outer casing.

Preferably, the method further comprises closing an aperture in the outer casing, through which the relief device is installed, with a removable cover. This serves to prevent debris entering the aperture and to protect the relief device from damage whilst the hot water storage unit is in transit, from the time of manufacture of the hot water storage unit to the time of installation at the required site.

Preferably, the method further comprises removably retaining a drain at the exterior of the outer casing, in use, to direct water, that exits from the relief device, away from the outer casing.

The relief device, as herein before described, may be factory-fitted (i.e. at the time of manufacture of the hot water storage unit) or, alternatively, fitted by an installer at the time of installation of the hot water storage heater at its site of use (e.g. a domestic, commercial or other installation).

The relief device, as herein before described, may be pressure and/or temperature sensitive such that the relief device is opened when the sensed pressure and/or temperature of the water in the vessel reaches, or exceeds, a set level.

Preferably, the drain is removably retained by the installer, rather than being factory-fitted.

BRIEF DESCRIPTION OF DRAWINGS

The present invention will now be described, by way of example only, with reference to the accompanying drawings, in which:

FIGS. 1A, 1B and 1C illustrate a conventional hot water storage unit;

FIG. 2A is a partly cross sectional side view of an embodiment of a hot water storage unit in accordance with one aspect of the present invention;

FIG. 2B is a detail cross sectional side view showing the relief device and drain of the hot water storage unit shown in FIG. 2A;

FIG. 3A is a first detail cross sectional side view of a first embodiment of a relief device and drain installed in a hot water storage unit, in accordance with an aspect of the present invention, having insulation of a first thickness, and as shown in FIGS. 2A and 2B;

FIG. 3B is a second detail cross sectional side view showing a second embodiment of a relief device and drain installed in a hot water storage unit, in accordance with an aspect of the present invention, having insulation of a second thickness;

FIGS. 5A to 5F show, respectively, a first perspective view, a second perspective view, an end view, a side view, a cross sectional side view and an exploded perspective view of the second embodiment of the relief device shown included in FIG. 3B;

FIG. 5G shows a cross sectional side view of the relief device shown in FIGS. 5A to 5F, with the relief device in the closed condition;

FIG. 5H shows a cross sectional side view of the relief device shown in FIGS. 5A to 5F, with the relief device in an open condition;

FIGS. 6A to 6E show, respectively, a first perspective view, a second perspective view, an end view, a side view and a cross sectional side view of a third embodiment of a relief device in accordance with an aspect of the present invention;

FIGS. 7A to 7E show, respectively, a first perspective view, a second perspective view, an end view, a side view and a cross sectional side view of a fourth embodiment of a relief device in accordance with an aspect of the present invention;

FIGS. 8A to 8E show, respectively, a first perspective view, a second perspective view, an end view, a side view and a cross sectional side view of a fifth embodiment of a relief device in accordance with an aspect of the present invention;

FIG. 9A is a cross sectional side view showing an alternative embodiment for sealing between a sixth embodiment of a relief device, in accordance with an aspect of the present invention, and the socket connected to the vessel;

FIG. 9B is a cross sectional side view showing a further alternative embodiment for sealing between the sixth embodiment of a relief device, shown in FIG. 9A, and the socket connected to the vessel;

FIGS. 10A to 10D show, respectively, a perspective view, a side view, a front view and a cross sectional side view of an embodiment of an escutcheon for the hot water storage unit of the present invention, with FIG. 10D also showing the socket;

FIGS. 12A to 12C show, respectively, a side view, a perspective view and an exploded perspective view of a second embodiment of a drain for the hot water storage unit for the present invention;

FIGS. 13A to 13C show, respectively, a perspective view, a front view and a side view of a seventh embodiment of a relief device and a third embodiment of drain (and including the escutcheon) in accordance with an aspect of the present invention, being suitable for top mounting in a hot water storage unit;

FIG. 13D shows a detail cross sectional side view of the relief device, shown in FIGS. 13A to 13C, installed in a hot water storage unit.

DESCRIPTION OF EMBODIMENTS

Figure 1C:
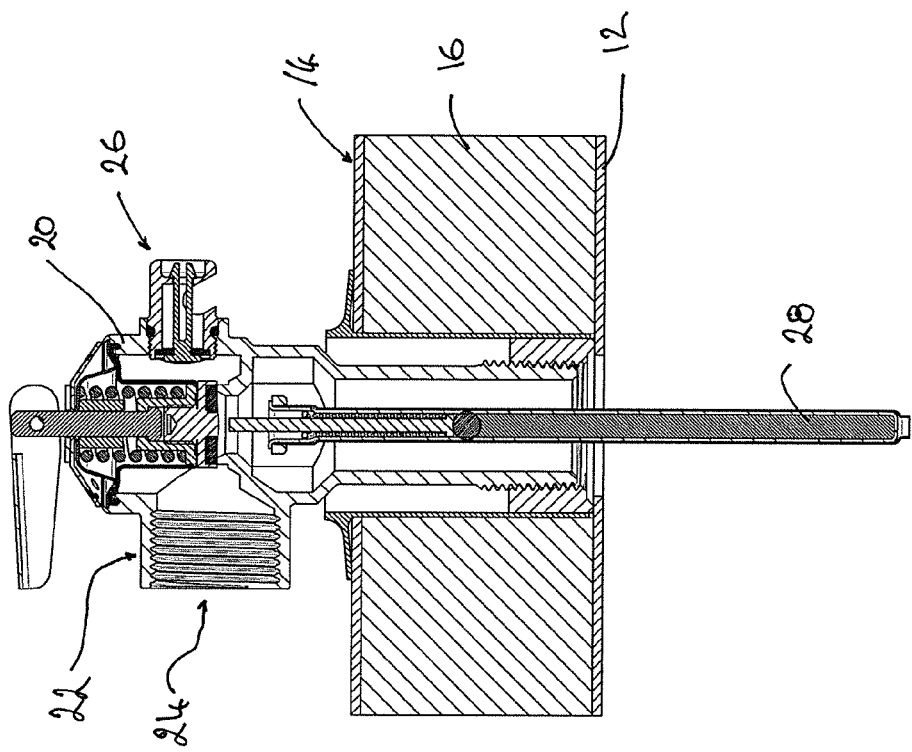
Figure 4B:
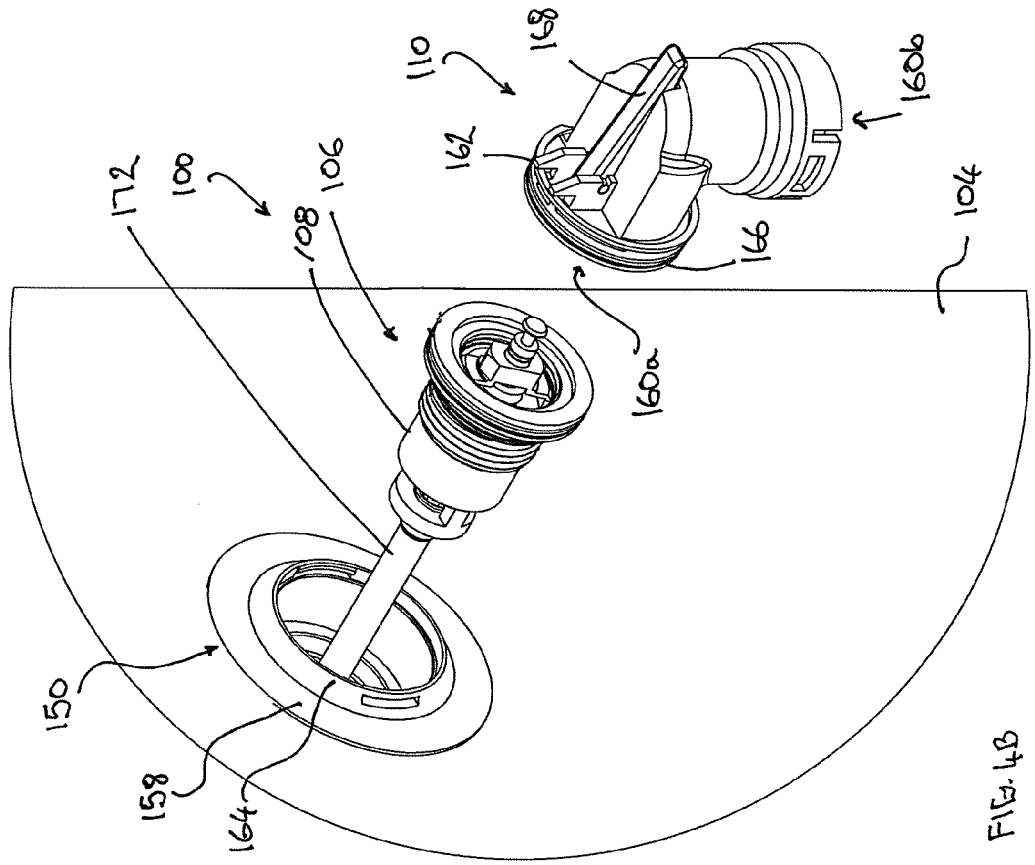
FIG. 4B is a detail perspective view of the relief device and drain shown in FIG. 4A.
Figure 4A:
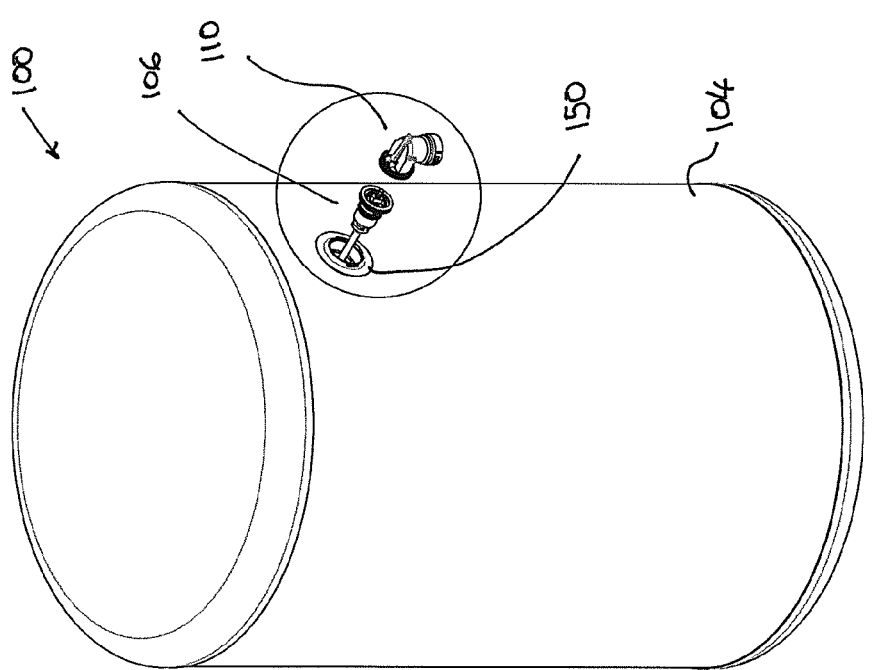
FIG. 4A is a first perspective view of an embodiment of a hot water storage unit in accordance with one aspect of the present invention showing a partly exploded view, with the relief device and drain separated from the remainder of the hot water storage unit.
Figure 4D:
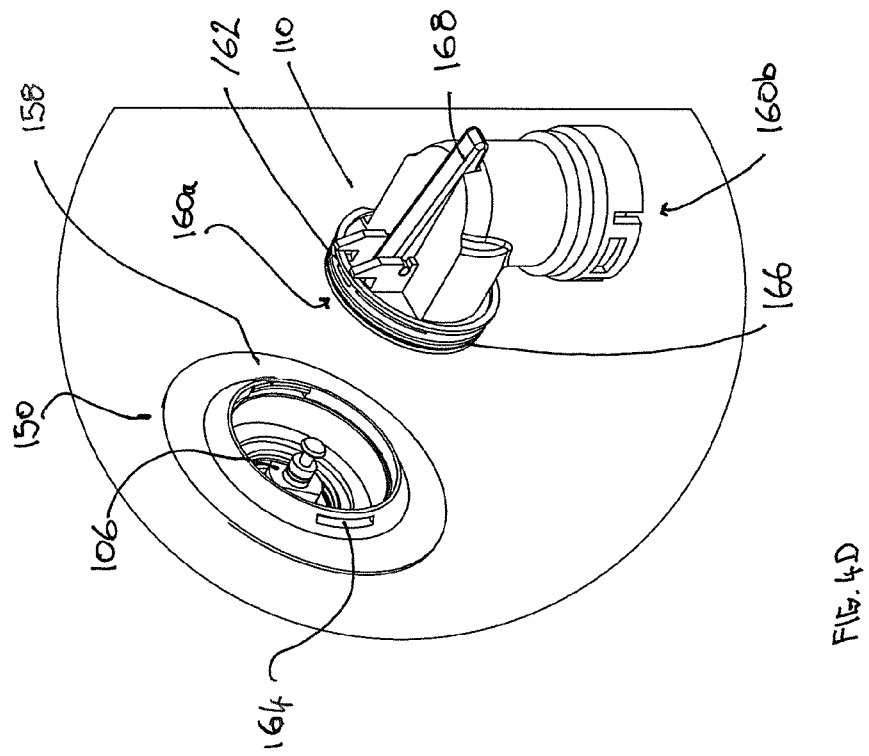
FIG. 4D is a detail perspective view of the relief device and drain shown in FIG. 4C.
Figure 4C:
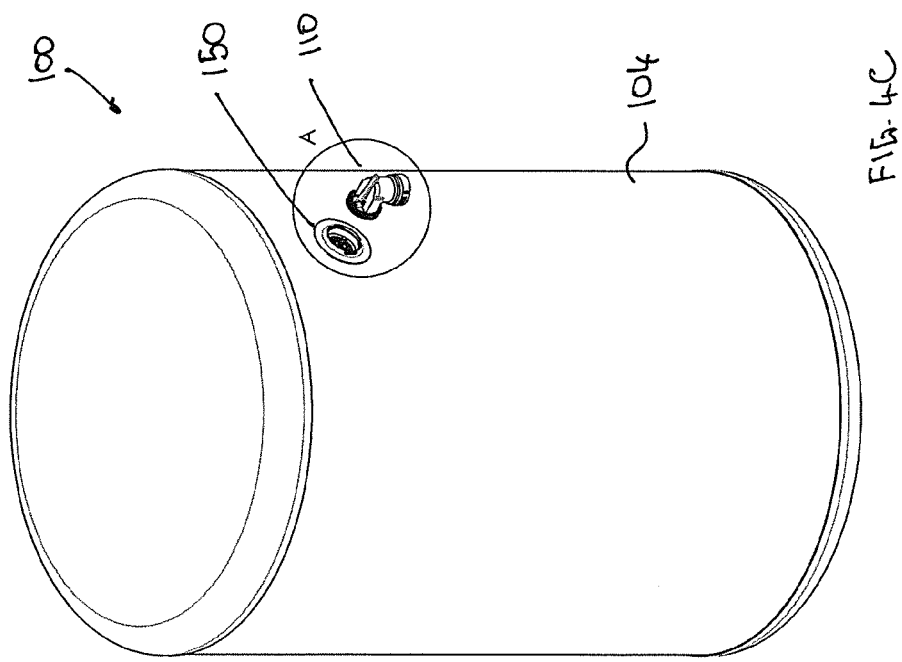
FIG. 4C is a second perspective view of the hot water storage unit shown in FIG. 4A, with the relief device connected therewith.

The same reference numerals are used to denote the same or equivalent parts in the various embodiments described herein. Such parts that are described with reference to one or more embodiments will not again be described with reference to the other embodiments described herein. It is to be understood that the description of such parts and their operation with reference to such one or more embodiment/s also applies to the other embodiment/s.

In FIGS. 2A to 4D, there is shown an embodiment of a hot water storage unit 100 in accordance with an aspect of the present invention. The hot water storage unit 100 comprises a vessel, also referred to as cylinder, 102, in which hot water (W) is storable, an outer casing 104 that encloses the vessel 102, and a relief device 106. The relief device 106 is shown in greater detail in FIG. 3A. In use, If the temperature and/or pressure of the water inside the vessel 102 reaches or exceeds the set pressure and/or temperature of the relief device 106, the relief device 106 opens such that the relief device is in fluid communication with the inside of the vessel 102. Water can then escape from inside the vessel 102 and exit via the relief device 106 to relieve, or reduce, excess pressure and/or temperature inside the vessel 102. When the pressure and/or temperature falls below the set pressure and/or temperature of the relief device 106, the relief device 106 closes and water cannot escape from the vessel 102 through the relief device 106.

The relief device 106 comprises a housing 108 containing operational components of the relief device 106, as will be further described herein.

Figure 11:
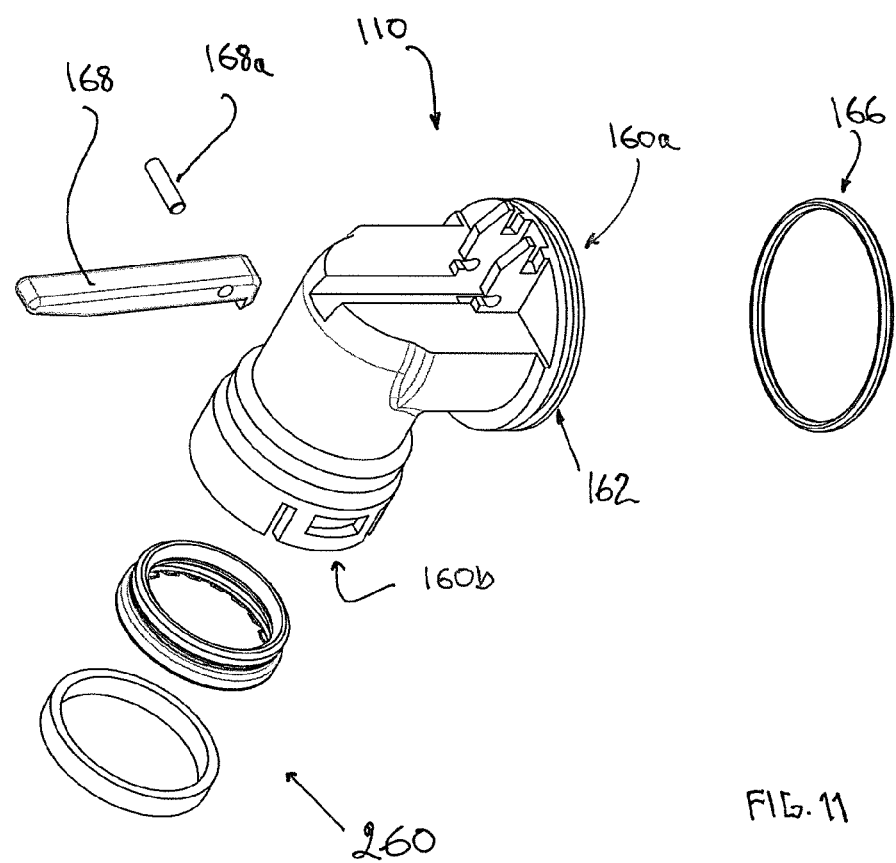
FIG. 11 shows an exploded perspective view of the embodiment of the drain for the hot water storage unit of the present invention, shown in FIGS. 2A to 4D.

A drain 110 is provided for the hot water storage unit 100. In use, the drain 110 directs water, which exits from the relief device 106, away from the outer casing 104. The drain 110 is removably retainable at the outer side, or outside, 112 of the outer casing 104. The drain 110 is shown separately in FIG. 11.

The hot water storage unit 100 is further provided with an outlet 114 for heated water to exit from inside the vessel 102. An inlet 116 for water entering the vessel 102 is also provided. The outlet 114 and inlet 116 are connected to suitable conduits to convey water, respectively, from and to the vessel 102.

Insulation material 118 is provided between the outer side, or outside, 120 of the vessel 102 and the inner side, or inside, 122 of the outer casing 104. The water inside the vessel 102, is in contact with the surface of the vessel 102 at the inner side, or inside, 124 of the vessel 102.

The relief device 106 includes a closure mechanism 126 that is at least partly located in the housing 108. The closure mechanism 126 comprises a spring 128 and a stem 130. The spring 128 is provided around the stem 130, inside the housing 108. The spring 128 acts to bias the relief device 106 to a closed condition and the stem 130 is movable against the biasing action of the spring 128 in an open condition of the relief device 106. The spring 128 and the stem 130 are located, in the housing 108, behind the outer casing 104, on the inner side 122 of the outer casing 104.

The relief device 106 further comprises a seat 132 that surrounds an opening 134. The opening 134 forms the opening to the housing 108 through which water is able to enter the housing 108.

The closure mechanism 126 is provided with a seal 136, at the end of the stem 130 located in the housing 108. The seal 136 seats on the seat 132 in a closed condition of the relief device 106, as shown in FIG. 3A, and is spaced from the seat 132 in an open condition of the relief device 106.

The stem 130 extends from the housing 108 to an end portion 138.

The vessel 102 and the outer casing 104 are provided with aligned apertures, in their respective sides, to accommodate the relief device 106.

A socket 140 is attached to the vessel 102, at the outer side 120 of the vessel 102. The socket 140 may be connected to the vessel 102 by welding, as shown at 142. The socket 140 is provided with a screw thread 144a. The housing 108 of the relief device 106 is provided with a complementary screw thread 144b which is able to engage with the screw thread 144a of the socket 140. The engagement of these screw threads 144a and 144b, shown at 144, removably retains the relief device 106 relative to the vessel 102. Since the socket 140 is fixed to the vessel 102, the relief device 106 is removably retained with the vessel (via the socket). Disengaging the screw threads 144a and 144b detaches the relief device 106 from the socket 140 such that the relief device 106 is removable from the vessel 102. The relief device 106 is removably retained by being detachably retained with the socket 140.

A seal 146, such as an O-ring, is provided between the housing 108 and the socket 140. The seal 146 may be provided in a groove in the outer surface of the housing 108.

The housing 108 has a portion 108a with a diameter greater than that of the remainder of the housing 108. The portion 108a forms an annular surface 108b. When the relief device 106 is installed, the annular surface 108b abuts the socket 140.

An escutcheon 150 extends from the outer side 112 of the outer casing 104 to the inner side 120 of the vessel 102, through the aligned apertures in the vessel 102 and the outer casing 104 that accommodate the relief device 106. A portion 152 of the escutcheon 150 frictionally engages around the exterior surface of the socket 140. The escutcheon 150 is shown separately in FIGS. 10A to 10D, and the socket 140 is also shown in FIG. 10D.

A seal 154, such as an O-ring, is provided between the housing 108 and the escutcheon 150. The seal 154 may be provided in a groove in the outer surface of the housing 108, at the portion 108a.

The escutcheon 150 comprises a tubular portion 156 and a flange portion 158. The portion 152 is part of the portion 156 and is spaced from the flange 158. The tubular portion 156 extends from the flange portion 158, and extends from the outer side 112 of the outer casing 104 to the inner side 120 of the vessel 102. The flange portion 158 abuts the outer casing 104 at the outer side 112 of the outer casing 104.

Accordingly, the relief device 106 may be removably positioned on the inner side 122 of the outer casing 104 so that it is in full communication with the inside of the vessel 102 such that the housing 108 is located behind the outer casing 104 on the inner side 112 of the outer casing 104.

The relief device 106 may be installed at the time of manufacture of the hot water storage unit or at the time of installation of the hot water storage unit at the required site.

FIG. 3B shows an alternative embodiment in which a different thickness of insulation material 118 is used. In FIG. 3B the insulation 118 has a lesser thickness. In this embodiment, the stem 130, of the relief device 200, is shorter in length, than the stem 130 of the relief device 106 shown in FIG. 3A, and the housing 108 is located closer to the outer casing 104, although still behind the outer casing 104 at the inner side 122 of the outer casing 104. In other respects, the relief device 200, of the second embodiment, and the relief device 106, of the first embodiment, are the same.

FIGS. 3A and 3B clearly illustrate two of the advantages of the present invention, namely that when the relief device is installed, the probe 172 (further described later herein) is fully immersed in the water in the vessel 102 and that probes 172 do not need to be made in a range of lengths. In all of the embodiments described herein, the probe 172 is fully immersed in the water in the vessel 102.

In all of the embodiments of the present invention, the spring 128 and stem 130 are provided such that they extend inwardly of the housing from the opening to the housing through which water is able to enter the housing.

In all of the embodiments of the present invention, the spring 128 and stem 130 are provided in the housing such that they are proximate, or at the region of, the vessel 102 when the relief device is installed. The housing, and these components within the housing (for example, components such as the spring 128, the stem 130, or at least the predominant portion of the stem 130, and the closure mechanism 126), are insulated by the insulation material 118, that is located between the vessel 102 and the outer casing 104, and/or the portion of the housing containing these components extends into the interior of the vessel 102 (as can be seen in FIGS. 3A and 3B and in FIGS. 13D and 14E, which are described later herein). This insulation by the insulation material 118 and/or effectively by extending into the water in the vessel 102 reduces heat loss through the housing and through these components within the housing.

In all of the embodiments of the present invention, the housing (of the relief device) is located, or positioned, to be substantially behind the outer casing 104, i.e. on the inner side 122 of the outer casing 104, of the hot water storage unit. That is, the housing (of the relief device) is located, or positioned, such that it is predominantly behind the outer casing 104, i.e. on the inner side 122 of the outer casing 104, of the hot water storage unit. Such positioning of the housing (of the relief device) also means that it is located, or positioned, such that it is substantially, i.e. predominantly, behind the escutcheon, i.e. on the inner side 122 of the outer casing 104, of the hot water storage unit.

Locating the housing of the relief device to be substantially behind the outer casing 104 on the inner side 122 of the outer casing 104, in the present invention, as herein before described, has significant advantages.

Firstly, it protects the relief device from damage since the relief device does not project appreciably beyond the escutcheon 150 or the outer side 112 of the outer casing 104. This means that the relief device may be factory-fitted with little risk of it sustaining damage in transit, i.e. from the time of manufacture of the hot water storage unit 100 until the time of installation at the required site.

In addition, during manufacture of the hot water storage unit 100, the relief device may be factory-fitted to the bare vessel 102, prior to the outer casing 104 and insulation 118 being applied. This enables the bare vessel 102 to be pressure tested in the factory, at the time of manufacture of the hot water storage unit 100. Pressure testing in the factory ensures that the connection of relief device is leak-tight (i.e. no leakage from the vessel 102) and also that the relief device operates at the correct pressure and/or temperature setting before the bare vessel 102 continues to the next production steps in which the outer casing 104 and the insulation material 118 are applied. Since the relief device is fitted such that the housing 108 does not project appreciably, or substantially, beyond where the outer casing 104 is positioned relative to the vessel 102, this permits the outer casing 104, in manufacture of the hot water storage unit 100, to slide over the vessel 102 with the relief device installed. Insulation material 118 may then be injected, or inserted, into the space between the vessel 102 and the outer casing 104.

Furthermore, locating the housing of the to be substantially behind the outer casing 104 on the inner side 122 of the outer casing 104 provides insulation for the relief device and reduces heat losses since the housing of the relief device and the components within the housing are insulated by the insulation material 118 and/or the portion of the housing of the relief device containing these components extends into the interior of the vessel 102 (such that the water with the vessel effectively provides insulation to them.

Advantages such a these, are not provided by the prior art.

The drain 110 has an inlet 160a and an outlet 160b. The drain 110 is removably retainable at the outer side 112 of the outer casing 104 such that it is movable to permit the outlet 160b of the drain 110 to be positioned at a selected orientation so that it is angled downwardly. For example, the drain 110 may be movable by being rotatable relative to the relief device. This ensures that water discharged from the relief device 106, which then passes through the drain 110, exits the drain 110 from the outlet 160b and falls away from the drain 110 (and the outer casing 104) and does not pool in the drain 110.

The drain 110 may be removably retainable at the outer side 112 of the outer casing 104 by being detachably retained with the escutcheon 150. In that regard, as best seen in FIGS. 4B and 4D and FIGS. 10A to 10D (for the escutcheon 150), the drain 110 and the escutcheon 150 may be provided with respective complimentary snap-on connectors 162 and 164 that can releasably engage to thereby detachably retain the drain 110 with the escutcheon 150 at the outer side 112 of the outer casing 104. Disengaging the snap-on connectors 162 and 164 detaches the drain 110. (It is then possible to access the relief device 106, if required, e.g. for maintenance or replacement of the relief device 106.) The snap-on connectors 162 and 164 are provided such that the drain 110 is able to move, e.g. rotate, relative to the escutcheon 150 (and the relief device 106). The drain 110 can then be readily moved to orientate the outlet 160b of the drain 110 at the desired orientation.

A seal 166, such as an O-ring, is provided between the drain 110 and the escutcheon 150. The seal 166 may be provided in a groove in the outer surface of the drain 110, near the outlet 160b.

The drain 110 is provided with a manually operable member 168 that is operably engageable with the relief device 106 to open the relief device 106 such that water can exit from the vessel 102. The manually operable member 168 is pivotable (by way of pivot pin 168a) and has a lug 170 that can engage with the end portion 138 of the stem 130 to move the stem 130 against the biasing action of the spring 128 and move the seal 136 away from the seat 132 to open the relief device 106.

The relief device 106 is further provided with a probe 172 that extends into the vessel 102 and is in contact with the water in the vessel 102. The probe 172 contains a material 174 that expands when heated. When the temperature of the water in the vessel 102 reaches or exceeds a set level (the set temperature of the relief device 106), the expanding material 174 will bear against the end of the stem 130, adjacent the seal 136, to move the stem 130 against the biasing action of the spring 128, and move the seal 136 away from the seat 132 to open the relief device 106. This operation is the same as for conventional temperature relief valves.

The relief device 106 is also pressure sensitive. If the pressure of the water in the vessel 102 reaches or exceeds a set level (the set pressure of the relief device 106), the stem 130 will be forced to move against the biasing action of the spring 128 and the seal 136 will move away from the seat 132 to open the relief device 106. This operation is the same as for conventional pressure relief valves.

The hot water storage unit of the present invention may be made by providing a suitable vessel 102. The vessel 102 is provided with suitable apertures therein for a water inlet, a water outlet, an aperture to accommodate the relief device and any other apertures (or appropriate fittings). The socket 140 is connected to the vessel 102, e.g. by welding, such that it is located at the outer side 120 of the vessel 102. The relief device is then installed so that it is removably retained with the socket 140. The vessel 102 may then be pressure tested, as herein before described, with the relief device installed. In the event that the vessel 102 fails the pressure test, remedial work may be carried out to rectify the fault.

A suitable outer casing 104 is provided. (At this stage, the outer casing 104 does not have the casing top 104a and casing bottom (not visible in the drawings) fitted). The outer casing 104 is provided with suitable apertures therein for a water inlet, a water outlet, an aperture to accommodate the relief device and any other apertures (or appropriate fittings).

Once the pressure test, if conducted, has been completed, the outer casing 104 is slid over vessel 102. The outer casing 104 is slid over the vessel 102 such that the respective apertures, in the vessel 102 and the outer casing 104, for the water inlet, water outlet, to accommodate the relief device and any other apertures (or appropriate fittings) are aligned. Since the relief device does not project appreciably, or substantially, the outer casing 104 can be readily slid over the vessel 102. The escutcheon 150 is then affixed such that the flange 158 is flush with the outer casing at the outer side 112 of the outer casing 104.

The insulation material 118 is then injected, or inserted, into the space between the vessel 102 and the outer casing 104.

A casing top 104a and casing bottom are attached to complete the outer casing 104.

If the hot water storage unit 100 is to have a heater, the heater is installed at the appropriate stage of manufacture of the hot water storage unit 100. For example, in some systems, the heater may be provided inside the vessel, e.g. electrically powered heaters that employ heating elements inside the vessel to heat the water. In gas powered systems, a gas burner is provided beneath the vessel, inside the outer casing, to heat water in the vessel. In other systems, the heater may be provided outside the vessel and the outer casing, e.g. solar hot water systems and heat pump systems. In the latter case, the heater is not included in the hot water storage unit 100.

The further embodiments will now be described.

FIGS. 5A to 5H show various views of the second embodiment of the relief device 200, showing as included in the hot water storage system 100 showing in FIG. 3B. However, since the relief device 200 is shown it is uninstalled condition, the various parts and features of the relief device 200 can be seen clearly in these views.

In that regard, some features of the relief device 200 (and also the relief device 106) can be more clearly seen in FIG. 5F. In particular, the head 176 of the stem 130 can be seen, which is provided at the end of the stem 130 that is provided in the housing 108. The head 176 supports the seal 136.

The stem 130 is provided with a seal 178 near the end portion 138 of the stem 130 that is remote from the head 176. The seal 178 may be an O-ring and is located in a groove 180 in the stem 130. The seal 178 is provided between the stem 130 and the drain 110, when the drain 110 is installed.

The relief device 200 further comprises a cap 182. The cap 182 is connected to the housing 108, for example, by the engagement of screw threads 184 and 186 on the cap 182 and housing 108, respectively. The spring 128 is retained between the cap 182 and the head 176 (of the stem 130), which act as retainers for the spring 128.

The cap 182 has openings 188. These openings 188 form the outlet for the relief device 200 so that any water discharged through the relief device 200 exits via the openings 188. When the drain 110 is removably retained, at the outer side 112 of the outer casing 104, the (outlet) openings 188 of the relief device 200 are in fluid communication with an inlet 160a of the drain 110. Water escaping from the vessel 102, in the open condition of the relief device 200, exits the relief device 200 via the openings 188, then enters the drain 110 via the inlet 160a and exits the drain 110 from the outlet 160b.

Another opening 190 is provided so that the stem 130 may extend therethrough for engagement with the drain 110. In that regard, the manually operable member 168 may be pivoted, via pivot pin 168a, such that it engages a groove 138a provided at the region of the end portion 138 of the stem 130, when it is required to open the relief device 200 manually.

The housing 108 is provided with a support 192 for the probe 172. The support 192 is provided near the opening 134 of the housing 108. In addition to support for the probe 172, the support 192 also has openings 194 so that water can reach the opening 134 from inside the vessel 102.

FIGS. 5G and 5H show the relief device 200 in a closed and open condition, respectively. As can be seen in FIG. 5G in the closed condition of the relief device 200, the seal 136 seats on the seat 132. In contrast, in the open condition of the relief device 200, shown in FIG. 5H, the seal 136 is spaced from the seat 132. In use, the open condition of the relief device 200 occurs when the pressure and/or temperature inside the vessel 102, as sensed by the relief device 200 (e.g. the temperature sensed by the probe 172), reaches or exceeds the set pressure and/or temperature of the relief device 200. This then causes the stem 130 to move in the direction away from the seat 132, thereby moving the seal 136 off the seat 132 to open the relief device 200 so that water can escape from the vessel 102 via the relief device 200. When the sensed pressure and/or temperature inside the vessel 102 falls below the set pressure and/or temperature of the relief device 200, the relief device 200 returns to the closed condition.

The relief devices 106 and 200 are provided with housings that are made by machining. However, the housing of the relief device of the present invention may be made in alternative ways.

By way of example, FIGS. 6A to 6E show an embodiment of a relief device 300 in which the housing 302 has been made by sheet forming.

In the relief device 300, the seat 132, rather than being part of the housing itself as is the case in the relief devices 106 and 200, is a separate seat member 304 which is retained in the housing 302. A seal 306 is provided between the seat member 304 and the housing 302. The seat member 304 is retained in the housing 302 by roll forming the sheet material on the housing 302 as shown at 308. The housing 302 is provided with openings 310 near the end of the housing 302 that is spaced from the seat member 304. The openings 310 form the outlet of the relief device 300. A cap 312 is provided at the end of the housing 302 spaced from the end at which the seat member 304 is located. The spring 128 is retained between the cap 312 and the head 176, which act as retainers for the spring 128. The cap 312 also has an opening through which the stem 130 projects. The cap 312 is connected to the housing 302 by screw threads in a similar manner to the screw threads 184 and 186 on the cap 182 and housing 108, respectively, of the relief devices 106 and 200.

FIGS. 7A to 7E show a fourth embodiment of a relief device 400 in which the seat 132 is formed by pressing a portion of the housing 402 of the relief device 400.

The relief device 400 illustrates how the housing 402 can be made in two parts 402a and 402b. The part 402a, which has the seat 132, is connected to a second part 402b. This connection can be by pressing together the housing parts 402a and 402b, as shown at 404.

The openings 310 are provided in the housing part 402b and these openings 310 form the outlet for the relief device 400.

The cap 312 is connected to the housing part 402b by screw threads in a similar manner to the screw threads 184 and 186 on the cap 182 and housing 108, respectively, of the relief devices 106 and 200.

The previous embodiments that have been described herein relate to a relief device that is sensitive to both pressure and temperature of the water inside the vessel 102. Those embodiments could be modified to form a relief device that is sensitive to temperature only by not having the openings 194 in the support 192. The absence of these openings 194 would then prevent pressure of the water inside the vessel 102 acting on the seal 136 to move it away from the seat 132 and open the relief device.

FIGS. 8A to 8E show an embodiment of a relief device 500 that is sensitive to pressure only. This is achieved by not having a probe 172 fitted to the support frame 192 of the relief device 500. In other respects, the relief device 500 shown in FIGS. 8A to 8E is similar to the relief device 200 shown in FIGS. 5A to 5H.

It will also be understood that the relief devices of the other embodiments described herein may be pressure sensitive only by not including a probe 172.

FIGS. 9A and 9B show an alternative embodiment to removably retain the relief device, of the present invention, with the vessel 102, along with two embodiments of providing sealing between the relief device and the socket.

FIG. 9A shows an embodiment of a relief device 600, installed in a hot water storage system 100 in which the seal 146 (which may be an O-ring) is provided between the housing 602 and the socket 604. In this embodiment, the socket 604 is provided with an annular surface 606. The annular surface 108b of the housing 602 abuts the annular surface 606 of the socket 604. A retention member 608 is screw threadedly engaged with the socket 604 via respective screw threads on the socket 604 and the retention member 608, as shown at 610, to thereby (abuttingly) sandwich the portion 108a of the housing 602 between the socket 604 and the retention member 608. This retains the relief device 600 in abutment with the socket 604 and removably retains the relief device 600 relative to the vessel 102. The retention member 608 may be provided in the form of circular nut with an external screw thread. The seal 146 is provided in a groove 612 in the socket 604.

In FIG. 9B, the sealing between the relief device 600 and the socket 604 is by a seal 146a (which may be a flat seal, such as a washer seal) located between the annular surface 108b of the housing 602 and the annular surface 606 of the socket 604. In this embodiment, the groove 612 in the socket 602 is not required. In other respects, this embodiment is similar to the embodiment of FIG. 9A.

The sealing arrangements shown in FIGS. 9A and 9B may be used in embodiments of the relief device in which the housing is not provided with a screw thread 144b for engagement with the socket connected to the vessel 102. Thus, the sealing arrangements shown in FIGS. 9A and 9B may be used for the relief devices 300 and 400, herein before described.

In FIGS. 12A to 12C there is shown a second embodiment of a drain 110a. The drain 110a is similar to the drain 110 except that it incorporates an auxiliary relief 250. The auxiliary relief 250 comprises a deformable member 252 that can deform and open to permit discharge of water, if required. The auxiliary relief 250 is provided for auxiliary relief in the same way that conventional pressure-temperature relief valves are provided with an auxiliary relief mechanism.

The drains 110 and 110a may be attached to connecting conduits by any suitable means. For example, a push-fit connector 260, as shown in FIG. 11 and FIGS. 12A to 12C, may be used.

FIGS. 13A to 13D show a further embodiment of a relief device 700 and a further embodiment of a drain 110b.

Whilst the embodiments of the relief devices and drains herein before described are for side-mounting relative to the vessel 102, the relief device 700 is for top-mounting relative to the vessel 102.

In the embodiment shown in FIGS. 13A to 13D, the drain 110b is detachably retainable with the relief device 700 to detachably retain the drain 110b at the outer side, or outside, 112 of the outer casing 104.

The relief device 700 comprises a housing 702 which is screw threadedly engaged with the socket 140, as shown at 144, to removably retain the relief device 700 with the vessel 102, in a manner similar to that described with reference to the other embodiments herein.

The spring 128 and the stem 130 are located in the housing 702. The seat 132 is provided at the end of the housing 702 that is opposite to the end at which it is located in the other embodiments described herein. That is, seat 132 is provided at the end of the housing 702 that is farthest from the vessel 102, whereas in the other embodiments the seat 132 is near the end of the housing that is closest to the vessel 102.

The spring 128 is provided around the stem 130 and is retained between a retention surface 704 (in the housing 702) and a retainer member 706 provided near the end of the stem 130 that is spaced from the seat 132. The retainer member 706 may be a nut that is screw threadedly connected to the stem, as shown at 708.

The stem 130 engages with a member 710 outside the housing 702. The member 710 supports the seal 136 by way of a support 712, which may be similar to the head 176 on the stem 130 in previous embodiments described herein. The seal 136 seats on the seat 132 in the closed condition of the relief device 700 and is spaced from the seat 132 in an open condition of the relief device 700.

The seal 178 seals between the member 710 and the drain 110b. The seal 178 may be provided on the member 710.

This embodiment illustrates an alternative for removably retaining the drain, of the present invention, at the outer side of the casing 104, in that the drain 110b is removably retainable with the relief device 700 (rather than with the escutcheon 150).

The drain 110b and the relief device 700 may be provided with respective complimentary snap-on connectors, such as the snap-on connectors 162 and 164 described in previous embodiments herein, that can releasably engage to thereby detachably retain the drain 110b with the relief device 700 at the outer side 112 of the outer casing 104. The drain 110b is able to move, e.g. rotate, relative to the relief device 700 (and the escutcheon 150). The drain 110b can then be readily moved to orientate the outlet 160b of the drain 110b at the desired orientation.

A seal 714 (such as an O-ring) is provided between the housing 702 and the drain 110b. The seal 714 may be provided in a groove in the housing 702.

A closure cap 716 closes off the housing 702 at the end of the housing opposite the end at which the seat 132 is located. The spring 128 extends through an aperture in the cap 716. The cap 716 may be screw threadedly engaged with the housing 702, as shown at 718.

An opening 720 is provided in the cap 716. The opening 720 forms the opening to the housing 702 through which water is able to enter the housing 702.

The opening 134, at the seat 132, is provided such that it is higher than any surrounding horizontal surface in the drain 110b. This ensures that water escaping from the vessel, via the relief device 700, flows downwardly away from the seat 132 and out of the drain 110b via the outlet 160b. Thus, water will not pool in the drain device 700.

FIGS. 14A to 14D show a further embodiment in which an intermediate member, or extension member, 850 is provided between the relief device 800 and the drain 110c.

The intermediate member 850 is substantially tubular, with an opening at each end and a passage for fluid flow extending between the openings. The relief device 800 and the drain 110c are connected to the intermediate member 850 such that the relief device 800 and the drain 110c are in fluid communication with the openings at the respective ends of the intermediate member 850.

The intermediate member 850 is provided with a screw thread 852 adjacent a first end 854 thereof. The screw thread 852 engages with the screw thread 186a adjacent the end 802 of the housing 108c of the relief device 800. Engagement of the screw threads 852 and 186a detachably connects together the intermediate member 850 and the relief device 800.

The intermediate member 850 is provided with a flange 856 adjacent the end of the screw thread 852 that is spaced from the end 854 of the intermediate member 850. A seal 858 is provided adjacent the flange 856 such that the seal 858 is located between the end 802 of the housing 108c of the relief device 800 and the flange 856 when the intermediate member 850 and the relief device 800 are connected together.

The second end 860 of the intermediate member 850, which is spaced from the first end 854, is provided with a series of teeth, or fingers, 862. Adjacent teeth 862 are separated by spaces 862a. The teeth 862 are provided at the circumference of the second end 860 and are orientated in the axial direction of the intermediate member 850.

A seal 864 is provided on the outer surface of the intermediate member 850, near the second end 860.

A barb 866 and a groove 868 are provided around the outer surface of the intermediate member 800. The barb 866 is arranged such that it tapers outwardly in the direction from the second end 860 to the first end 854 of the intermediate member 850.

An annular wave spring 870 is provided loosely on the intermediate member 850 adjacent the flange 856, on the side of the flange 856 opposed to the side at which the seal 858 is provided.

The drain 110c is provided with a ring 872 that is located in a groove in the inner surface of the drain 110c near the inlet 160a of the drain 110c.

The interior of the drain 110c is provided with a series of teeth, or fingers, 874. Adjacent teeth 874 are separated by spaces 874a.

The drain 110c and the intermediate member 850 can be connected by inserting the second end 860 of the intermediate member 850 into the interior of the drain 110c, via the inlet 160a, such that the barb 866 passes through the ring 872 and the ring 872 locates in the groove 868. In this way, the drain 110c and the intermediate member 850 are connected together. The seal 864 seals against the inside surface of the drain 110c. The drain 110c is movable relative to the intermediate member 850 and the relief device to thereby permit the outlet 160b of the drain 110c to be positioned at a selected orientation. For example, the drain 110c may be movable by being rotatable relative to the intermediate member 850 and the relief device 800.

Thus, the drain 110c is removably retained with the relief device 800.

The wave spring 870 is located between the intermediate member 850 and the drain 110c, in particular, between the flange 856 of the intermediate member 850 and the end of the drain at the outlet 160a. The wave spring 870 acts to keep apart the teeth 862 of the intermediate member 850 and the teeth 874 of the drain 110c, which permits the drain 110c to move (e.g. rotate) relative to the intermediate member 850 and relative to the relief device 800. In this way, a tamper-proof connection is provided between the drain 110c and the intermediate member 850 such that the drain 110c and the intermediate member 850 are not separable, yet the drain 110c is still moveable (e.g. rotatable) relative to the intermediate member 850 (and relative to the relief device 800).

The drain 110c and the intermediate member 850 may be separated from the relief device 800 by detaching the intermediate member 850 (together with the drain) from the relief device 800. This is done by slightly rotating the drain 110c and simultaneously pushing the drain 110c toward the intermediate member 850, against the biasing action of the wave spring 870, such that the teeth 874 of the drain 110c engage in the spaces 862a of the intermediate member 850 and the teeth 862 of the intermediate member 850 engage in the spaces 874a of the drain 110c. This engagement of the teeth 874 and 862 with the spaces 862a and 874a, respectively, prevents rotation of the drain 110c relative to the intermediate member 850. Further rotation of the drain 110c, in the appropriate direction, causes the intermediate member 850 to rotate with the drain 110c such that the intermediate member 850 is unscrewed from the relief device 800 together with the drain 110c. The drain 110c, together with the intermediate member 850, is thereby removed from the relief device 800.

Figure 14A:
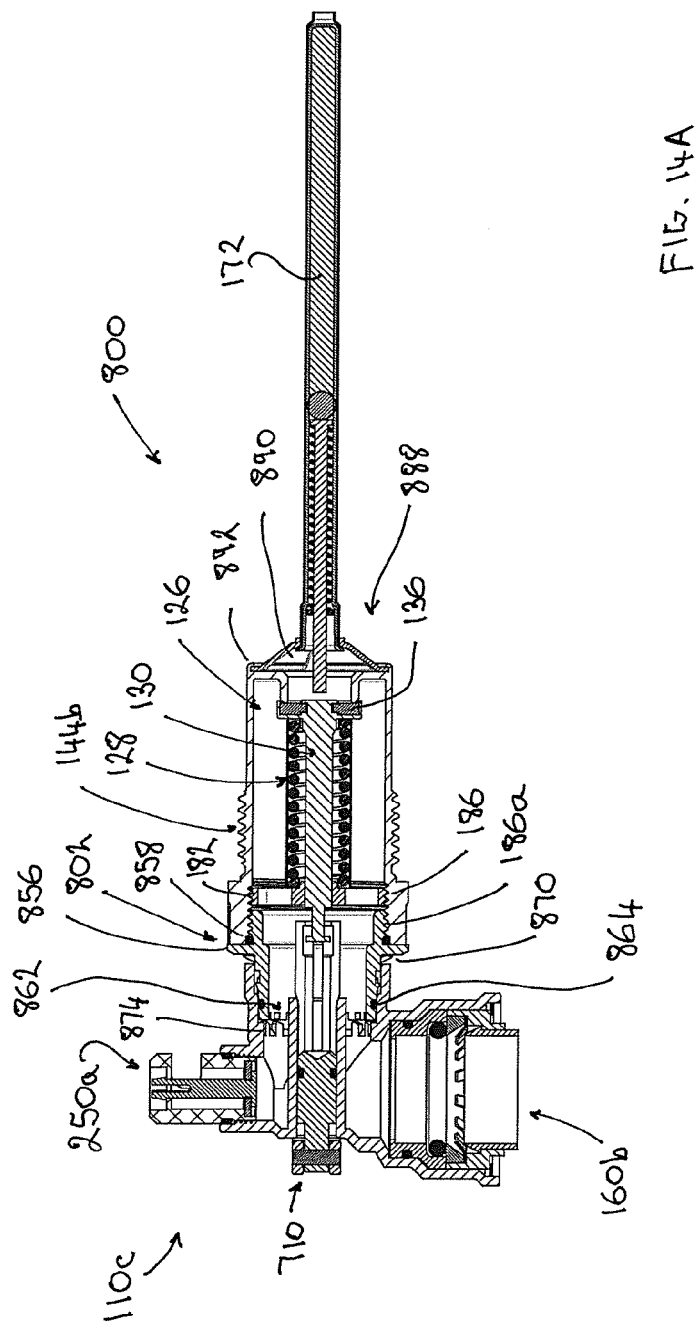
FIG. 14A to 14C show, respectively, a cross sectional side view, an exploded side view, and an exploded cross sectional side view, of an embodiment in which an intermediate member, or extension member, is provided between the relief device and the drain.
Figure 14D:
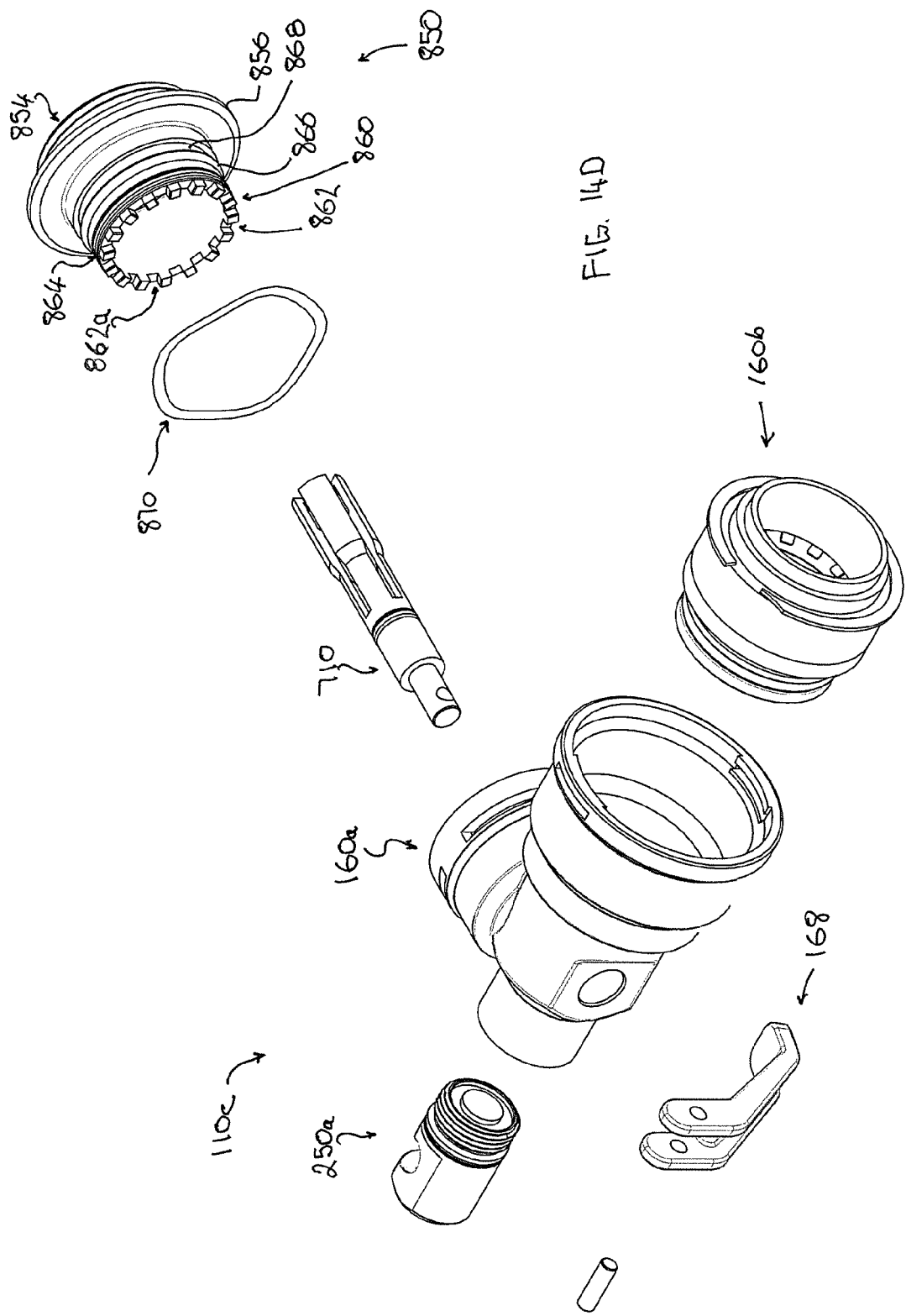
FIG. 14D shows an exploded perspective view of the drain and the intermediate member of the embodiment shown in FIGS. 14A to 14C; and, FIG. 14E shows a detail cross sectional side view of the embodiment of the relief device and drain, shown in FIGS. 14A to 14D, installed in a hot water storage unit.
Figure 14E:
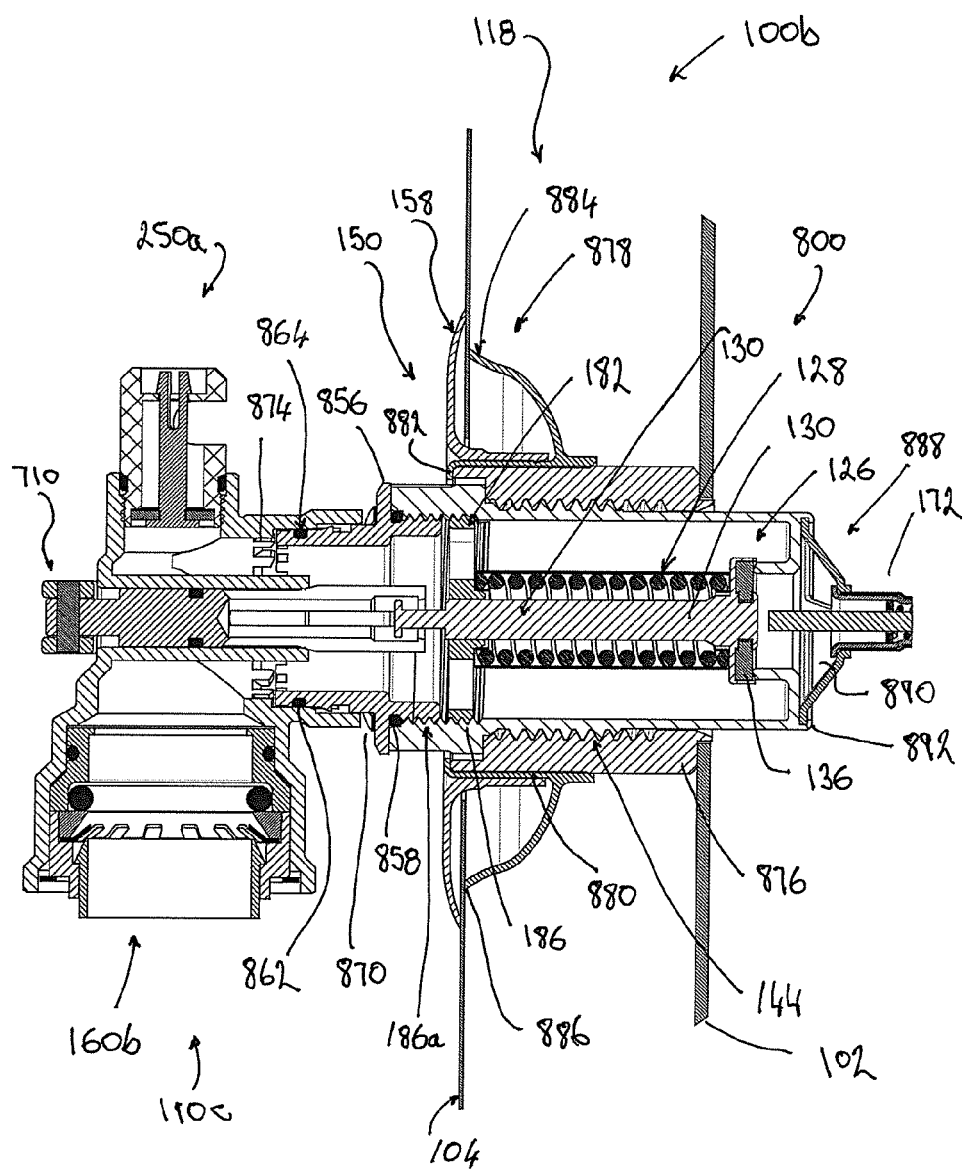

FIG. 14E shows a detail cross sectional view of a relief device 800 installed in a hot water storage unit 100b, with a drain 110c and a socket 876. The socket 876 serves a purpose similar to the sockets 140 and 604 previously described herein in connection with other embodiments. The socket 876 extends between the outer casing 104 and the vessel 102. A retention member 878 retains the socket 876. The retention member 878 has a collar portion 880 that extends around the outside surface of the socket 876 and has an edge 882 that is rolled over the outermost end of socket 876. The retention member 878 has an annular member 884 that extends around and outwardly from the collar portion 880. The distal edge 886 of the annular member 884 bears against the outer casing 104 in a direction opposed to the direction in which the (rolled) edge 882 acts on the end of the socket 876 to thereby retain the socket 876.

FIGS. 14A to 14E also show another embodiment of an arrangement to support the probe 172 of the relief device 800. In the relief device 800, the support member 888 has openings 890, which may be made, for example, by being punched into a stainless steel sheet, which is then formed to a depth suitable for the probe 172 to sit into such that it is retained by the retention member 888. The edge 892 of the housing 108c is mechanically rolled over the support 888 to secure it in position.

The intermediate member 850 which may be manufactured at various lengths to accommodate use with hot water storage units having various thicknesses of insulation material 118. This is a significant advantage to hot water storage unit manufacturers because it means they can use the same relief device and drain for all their hot water storage units and just change the intermediate member 850 to one of the appropriate length depending upon the thickness of the insulation material 118 of the particular hot water storage unit.

The intermediate member 850 may be made, for example, from plastics material.

The drain 110c incorporates an auxiliary relief 250a, which may be of conventional form.

In other respects the drain 110c may be similar to the drains 110, 110a and 110b previously herein before described.

In other respects, the relief device 800 may be similar to the relief devices of the other embodiments of the relief device described herein.

In the embodiments of the relief device of the present invention described herein, a boot (not shown) may be provided around the spring 128 to isolate the spring from water that enters the housing from the vessel 102.

Whilst preferred embodiments of the present invention have been herein before described, the scope of the present invention is not limited to those specific embodiments, and may be embodied in other ways, as will be apparent to a skilled addressee.

Modifications and variations such as would be apparent to a skilled addressee are deemed to be within the scope of the present invention.

The invention claimed is:
1. A hot water storage unit comprising
a vessel, in which hot water is storable,
an outer casing enclosing the vessel,
insulation material provided between the vessel and the outer casing,
a hot water outlet for heated water to exit from inside the vessel, a relief device, in use, to relieve excess pressure and/or temperature from inside the vessel by allowing water to escape from inside the vessel and exit from the relief device, wherein the relief device comprises a housing containing operational components of the relief device and the relief device is removably retainable relative to the vessel, such that the housing of the relief device is located substantially behind the outer casing on the inner side of the outer casing to provide insulation to the housing of the relief device; and wherein the operational components of the relief device include a seat and a seal, such that the seal seats against the seat in a closed condition of the relief device and the seal is spaced from the seat in an open condition of the relief device such that, in use, water can escape from inside the vessel and exit via the relief device in the open condition of the relief device.

2. A hot water storage unit according to claim 1, wherein the relief device has an outlet for water to exit therefrom, and wherein the hot water storage unit further comprises a drain to direct water, which exits from the relief device via the outlet of the relief device, away from the outer casing, wherein the drain is removably retainable at the outer side of the outer casing.

3. A hot water storage unit according to claim 2, wherein the drain is removably retainable at the outer side of the outer casing by being removably retainable with the relief device.

4. A hot water storage unit according to claim 2, wherein the drain is removably retainable at the outer side of the outer casing by being removably retainable with a support member located adjacent the outer casing.

5. A hot water storage unit according to claim 2, wherein the drain is removably retainable at the outer side of the outer casing by being removably retainable with an intermediate member that is removably retainable with the relief device.

6. A hot water storage unit according to claim 4, wherein the outermost end of the relief device does not extend substantially beyond the support member.

7. A hot water storage unit according to claim 4, wherein the support member comprises an escutcheon.

8. A hot water storage unit according to claim 2, wherein the drain has an outlet and the outlet of the drain is positionable at a selected orientation.

9. A hot water storage unit according to claim 8, wherein the drain is removably retainable at the outer side of the outer casing such that it is movable relative to the relief device to thereby permit the outlet of the drain to be positioned at a selected orientation.

10. A hot water storage unit according to claim 9, wherein the drain is movable relative to the intermediate member and the relief device to thereby permit the outlet of the drain to be positioned at a selected orientation.

11. A hot water storage unit according to claim 2, wherein at least one seal is provided between the relief device and the drain.

12. A hot water storage unit according to claim 2, wherein the relief device has an outlet for water to exit therefrom and the drain has an inlet, such that when the drain is removably retained at the outer side of the outer casing, the outlet of the relief device is in fluid communication with the inlet of the drain.

13. A hot water storage unit according to claim 1, wherein a socket is connected to the vessel and the relief device is engageable or abuttable with the socket such that the relief device is removably retainable relative to the vessel.

14. A hot water storage unit according to claim 13, wherein the relief device and the socket are provided with respective engageable screw threads such that the relief device is engageable with the socket, or the relief device is abuttable with the socket and a securing member engages with the socket to secure a portion of the relief device between the socket and the securing member.

15. A hot water storage unit according to claim 1, wherein the relief device further comprises a closure mechanism at least partly located in the housing, the closure mechanism comprising the seal, a spring and a stem, the spring acting to bias the relief device to a closed condition and the stem movable against the biasing action of the spring in an open condition of the relief device, wherein the housing is arranged such that when the relief device is removably retained relative to the vessel, the spring and the stem are located substantially behind the outer casing on the inner side of the outer casing.

16. A hot water storage unit according to claim 1, wherein the relief device is removably retainable relative to the vessel, such that the seat and a closure mechanism of the relief device are located behind the outer casing on the inner side of the outer casing, the closure mechanism including the seal that seats against the seat in the closed condition of the relief device.

17. A hot water storage unit according to claim 15, wherein the spring is located in the housing such that it is isolated from the water, in the vessel, in the closed condition of the relief device.

18. A hot water storage unit according to claim 1, wherein the relief device is pressure and/or temperature sensitive such that the relief device is opened when the sensed pressure and/or temperature of the water in the vessel reaches, or exceeds, a set level.

19. A hot water storage unit according to claim 1, wherein a heater is provided to heat the water.

20. A relief device comprising a housing containing operational components of the relief device wherein, in use, the relief device is removably retainable relative to the vessel of a hot water storage unit, the vessel adapted to store hot water and the hot water storage unit further comprising an outer casing enclosing the vessel and insulation material provided between the vessel and the outer casing, such that the housing of the relief device is located substantially behind the outer casing on the inner side of the outer casing, to provide insulation to the housing of the relief device, and the relief device is adapted to relieve excess pressure and/or temperature from inside the vessel by allowing water to escape from inside the vessel and exit from the relief device, wherein the operational components of the relief device include a seat and a closure mechanism provided with a seal, and wherein the seat surrounds an opening, and wherein the seal seats against the seat in a closed condition of the relief device and the seal is spaced from the seat in an open condition of the relief device such that, in use, water can pass from the vessel through the opening and escape from inside the vessel via the relief device, and wherein the seat and the seal are arranged to be located behind the outer casing on the inner side of the outer casing to provide insulation to the seat and the seal.

21. A relief device according to claim 20, wherein the relief device is provided with an outlet from which water can exit.

22. A relief device according to claim 20, wherein a drain is provided, in use, to direct away water, which exits from the relief device, and wherein the drain is removably retainable with the relief device.

23. A relief device according to claim 20, wherein a drain is provided, in use, to direct away water, which exits from the relief device, and wherein an intermediate member is provided and the drain is retainable with the intermediate member and the intermediate member is removably retainable with the relief device.

24. A relief device according to claim 22, wherein the drain has an outlet and the drain is movable relative to the relief device to thereby permit the outlet of the drain to be positioned at a selected orientation.

25. A relief device according to claim 23, wherein the drain has an outlet and the drain is movable relative to the relief device to thereby permit the outlet of the drain to be positioned at a selected orientation.

26. A relief device according to claim 20, wherein the relief device is pressure and/or temperature sensitive such that the relief device is opened when the sensed pressure and/or temperature of the water in the vessel reaches, or exceeds, a set level.

27. A method of making a hot water storage unit comprising
providing a vessel, in which hot water is storable,
providing a relief device, in use, to relieve excess pressure and/or temperature from inside the vessel by allowing water to escape from inside the vessel and exit from the relief device, the relief device comprising a housing containing operational components of the relief device,
providing an outer casing,
removably retaining the relief device relative to the vessel,
placing the outer casing around the vessel, and
placing insulation material between the vessel and the outer casing,
wherein the housing of the relieve device is located substantially behind the outer casing, on the inner side of the outer casing, to provide insulation to the housing of the relief device, after the outer casing has been placed around the vessel, and
wherein the operational components of the relief device include a seat and a closure mechanism provided with a seal, and wherein the seat surrounds an opening, and wherein the seal seats against the seat in a closed condition of the relief device and the seal is spaced from the seat in an open condition of the relief device such that, in use, water can pass from the vessel through the opening and escape from inside the vessel via the relief device, and
wherein removably retaining the relief device relative to the vessel comprises removably retaining the relief device relative to the vessel such that the seat and the seal are located behind the outer casing on the inner side of the outer casing to provide insulation to the seat and the seal.

28. A method according to claim 27, wherein placing the outer casing around the vessel comprises sliding the outer casing over the vessel.

29. A method according to claim 28, further comprising closing an aperture in the outer casing, through which the relief device is installed, with a removable cover.

30. A method according to claim 27, further comprising removably retaining a drain at the exterior of the outer casing, in use, to direct water, that exits from the relief device, away from the outer casing.

31. A method according to claim 27, wherein the relief device is pressure and/or temperature sensitive such that the relief device is opened when the sensed pressure and/or temperature of the water in the vessel reaches, or exceeds, a set level.

32. A hot water storage unit according to claim 1, wherein the operational components of the relief device comprise a seat and a closure mechanism provided with a seal, and wherein the seat surrounds an opening, and wherein the seal seats against the seat in a closed condition of the relief device and the seal is spaced from the seat in an open condition of the relief device such that, in use, water can pass from the vessel through the opening and escape from inside the vessel via the relief device.

33. A hot water storage unit according to claim 32, wherein the seat and the seal are located behind the outer casing on the inner side of the outer casing to provide insulation to the seat and the seal.

34. A hot water storage unit according to claim 32, wherein the seat and the seal are located inside the vessel to provide insulation to the seat and the seal.

35. A hot water storage unit according to claim 1, wherein the relief device is provided with a temperature sensitive probe and the temperature sensitive probe is located entirely behind the outer casing on the inner side of the outer casing.

36. A hot water storage unit according to claim 1, wherein the relief device is provided with a temperature sensitive probe and the temperature sensitive probe is fully immersed in the water in the vessel.

37. A relief device comprising a housing containing operational components of the relief device wherein, in use, the relief device is removably retainable relative to the vessel of a hot water storage unit, the vessel adapted to store hot water and the hot water storage unit further comprising an outer casing enclosing the vessel and insulation material provided between the vessel and the outer casing, such that the housing of the relief device is located substantially behind the outer casing on the inner side of the outer casing, to provide insulation to the housing of the relief device, and the relief device is adapted to relieve excess pressure and/or temperature from inside the vessel by allowing water to escape from inside the vessel and exit from the relief device,
wherein the operational components of the relief device include a seat and a closure mechanism provided with a seal, and wherein the seat surrounds an opening, and wherein the seal seats against the seat in a closed condition of the relief device and the seal is spaced from the seat in an open condition of the relief device such that, in use, water can pass from the vessel through the opening and escape from inside the vessel via the relief device, and
wherein the seat and the seal are arranged to be located inside the vessel to provide insulation to the seat and the seal.

38. A relief device according to claim 20, wherein the relief device is provided with a temperature sensitive probe and the temperature sensitive probe is arranged to be located entirely behind the outer casing on the inner side of the outer casing.

39. A relief device according to claim 20, wherein the relief device is provided with a temperature sensitive probe and the temperature sensitive probe is arranged to be fully immersed in the water in the vessel.

40. A method of making a hot water storage unit comprising:

providing a vessel, in which hot water is storable, providing a relief device, in use, to relieve excess pressure and/or temperature from inside the vessel by allowing water to escape from inside the vessel and exit from the relief device, the relief device comprising a housing containing operational components of the relief device, providing an outer casing, removably retaining the relief device relative to the vessel, placing the outer casing around the vessel, and placing insulation material between the vessel and the outer casing, wherein the housing of the relieve device is located substantially behind the outer casing, on the inner side of the outer casing, to provide insulation to the housing of the relief device, after the outer casing has been placed around the vessel, and wherein the operational components of the relief device include a seat and a closure mechanism provided with a seal, and wherein the seat surrounds an opening, and wherein the seal seats against the seat in a closed condition of the relief device and the seal is spaced from the seat in an open condition of the relief device such that, in use, water can pass from the vessel through the opening and escape from inside the vessel via the relief device, and wherein removably retaining the relief device relative to the vessel comprises removably retaining the relief device relative to the vessel such that the seat and the seal are located inside the vessel to provide insulation to the seat and the seal.

41. A method according to claim 27, wherein the relief device is provided with a temperature sensitive probe, and wherein removably retaining the relief device relative to the vessel comprises removably retaining the relief device relative to the vessel such that, in use, the temperature sensitive probe is located entirely behind the outer casing on the inner side of the outer casing.

42. A method according to claim 27, wherein the relief device is provided with a temperature sensitive probe, and wherein removably retaining the relief device relative to the vessel comprises removably retaining the relief device relative to the vessel such that, in use, the temperature sensitive probe is fully immersed in the water in the vessel.

43. A hot water storage unit according to claim 1, wherein the relief device is provided with a temperature sensitive probe and the temperature sensitive probe is external of the housing of the relief device.

44. A relief device according to claim 20, wherein the relief device is provided with a temperature sensitive probe and the temperature sensitive probe is external of the housing of the relief device.

45. A hot water storage unit according to claim 27, wherein the relief device is provided with a temperature sensitive probe and the temperature sensitive probe is external of the housing of the relief device.

* * * * *